US012175280B2

(12) United States Patent
Koob et al.

(10) Patent No.: US 12,175,280 B2
(45) Date of Patent: Dec. 24, 2024

(54) MEMORY TRANSACTION MANAGEMENT

(71) Applicant: QUALCOMM Incorporated, San Diego, CA (US)

(72) Inventors: Christopher Koob, Round Rock, TX (US); Venkatarami Mora, Cedar Park, TX (US)

(73) Assignee: QUALCOMM Incorporated, San Diego, CA (US)

( * ) Notice: Subject to any disclaimer, the term of this patent is extended or adjusted under 35 U.S.C. 154(b) by 720 days.

(21) Appl. No.: 17/451,988

(22) Filed: Oct. 22, 2021

(65) Prior Publication Data

US 2023/0126322 A1    Apr. 27, 2023

(51) Int. Cl.
G06F 9/46 (2006.01)
G06F 9/38 (2018.01)
G06F 9/52 (2006.01)
G06F 12/0891 (2016.01)

(52) U.S. Cl.
CPC ............ G06F 9/467 (2013.01); G06F 9/3851 (2013.01); G06F 9/52 (2013.01); G06F 12/0891 (2013.01)

(58) Field of Classification Search
CPC .......... G06F 9/467; G06F 9/3851; G06F 9/52; G06F 12/0891
See application file for complete search history.

(56) References Cited

U.S. PATENT DOCUMENTS

| | | | |
|---|---|---|---|
| 2009/0157944 A1 | 6/2009 | Robinson | |
| 2011/0078417 A1* | 3/2011 | Fahs | G06F 9/3004 |
| | | | 712/216 |
| 2011/0219187 A1 | 9/2011 | Gara et al. | |
| 2014/0207987 A1 | 7/2014 | Ahn et al. | |
| 2016/0292014 A1* | 10/2016 | Edmiston | G06F 11/14 |
| 2020/0112543 A1* | 4/2020 | Weed | H04L 63/1466 |
| 2021/0067952 A1* | 3/2021 | Miele | G06N 3/088 |

FOREIGN PATENT DOCUMENTS

| | | |
|---|---|---|
| CN | 101482813 A  * | 7/2009 |
| WO | 2014022402 A1 | 2/2014 |

OTHER PUBLICATIONS

International Search Report and Written Opinion—PCT/US2022/077131—ISA/EPO—Jan. 20, 2023.

* cited by examiner

*Primary Examiner* — Emerson C Puente
*Assistant Examiner* — Zhi Chen
(74) *Attorney, Agent, or Firm* — QUALCOMM Incorporated

(57) ABSTRACT

A device includes a processor coupled to a memory. The processor is configured to assign distinct domain identifiers to each of multiple software threads. The processor is also configured to control operation of one or more components of the processor based on a number of memory transactions associated with a domain identifier.

28 Claims, 23 Drawing Sheets

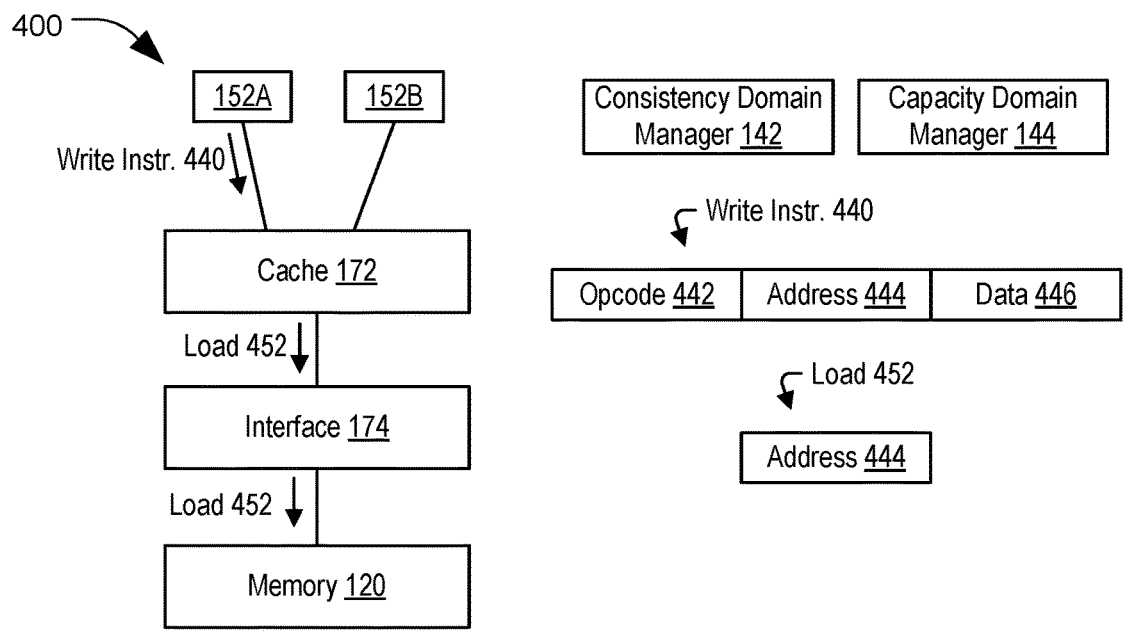
FIG. 4A
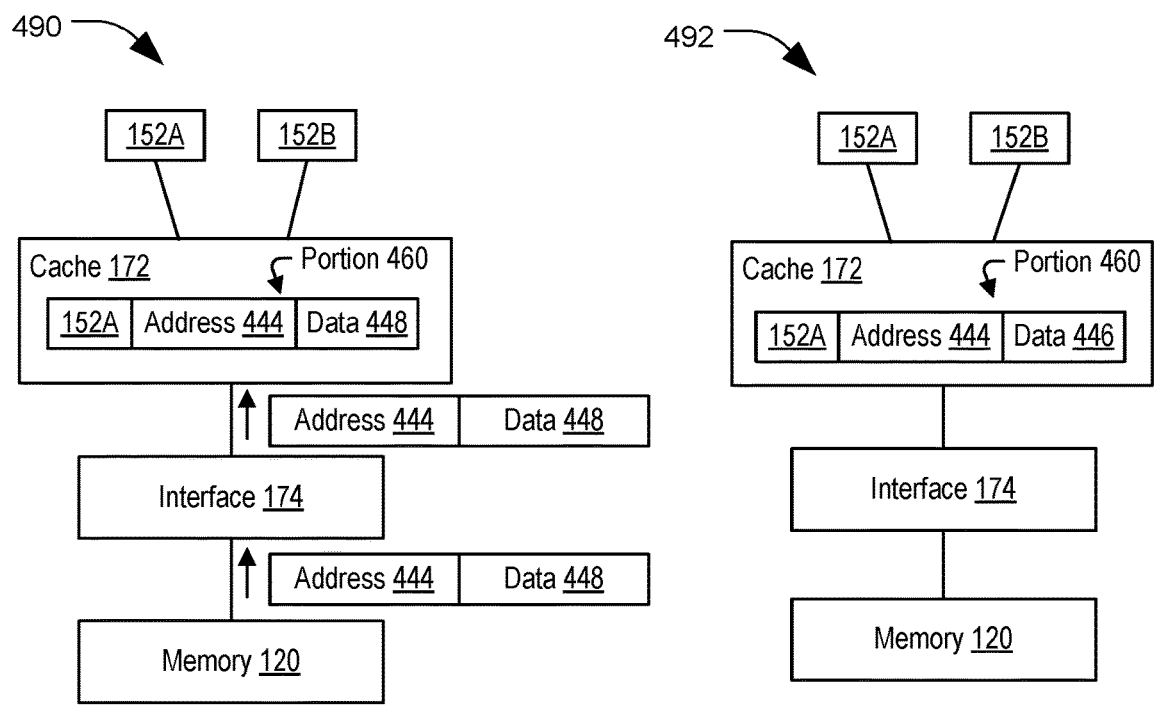
FIG. 4B  FIG. 4C

Synchronization

FIG. 7

MEMORY TRANSACTION MANAGEMENT

I. FIELD

The present disclosure is generally related to management of memory transactions.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices incorporate functionality to support memory transactions, such as reads from memory and writes to memory. Data that is read from memory or is to be written to memory is often temporarily stored in a buffer. Buffer resources are consumed as software threads make memory requests. Software threads stall when no buffer resources are available for a memory transaction. Some data may stay longer in the buffer for a software thread that takes longer to consume or process the data. Slower traffic can congest the system and block memory requests from other software threads, resulting in delays and reduced quality of service.

III. SUMMARY

According to one implementation of the present disclosure, a device includes a memory and a processor. The processor is coupled to the memory and is configured to assign distinct domain identifiers to each of multiple software threads. The processor is also configured to control operation of one or more components of the processor based on a number of memory transactions associated with a domain identifier.

According to another implementation of the present disclosure, a computer-implemented method includes assigning, at a device, distinct domain identifiers to each of multiple software threads. The method also includes controlling, at the device, operation of one or more components of a processor based on a number of memory transactions associated with a domain identifier.

According to another implementation of the present disclosure, a non-transitory computer-readable medium stores instructions that, when executed by a processor, cause the processor to assign distinct domain identifiers to each of multiple software threads. The instructions, when executed by the processor, also cause the processor to control operation of one or more components of the processor based on a number of memory transactions associated with a domain identifier.

According to another implementation of the present disclosure, an apparatus includes means for assigning distinct domain identifiers to each of multiple software threads. The apparatus also includes means for controlling operation of one or more components of a processor based on a number of memory transactions associated with a domain identifier.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

FIG. 4A is a diagram of an illustrative aspect of operation of the system of FIG. 1, in accordance with some examples of the present disclosure.

FIG. 4B is a diagram of an illustrative aspect of operation of the system of FIG. 1, in accordance with some examples of the present disclosure.

FIG. 4C is a diagram of an illustrative aspect of operation of the system of FIG. 1, in accordance with some examples of the present disclosure.

FIG. 7 is a diagram of an illustrative aspect of the system of FIG. 1, in accordance with some examples of the present disclosure.

V. DETAILED DESCRIPTION

Figure 1:
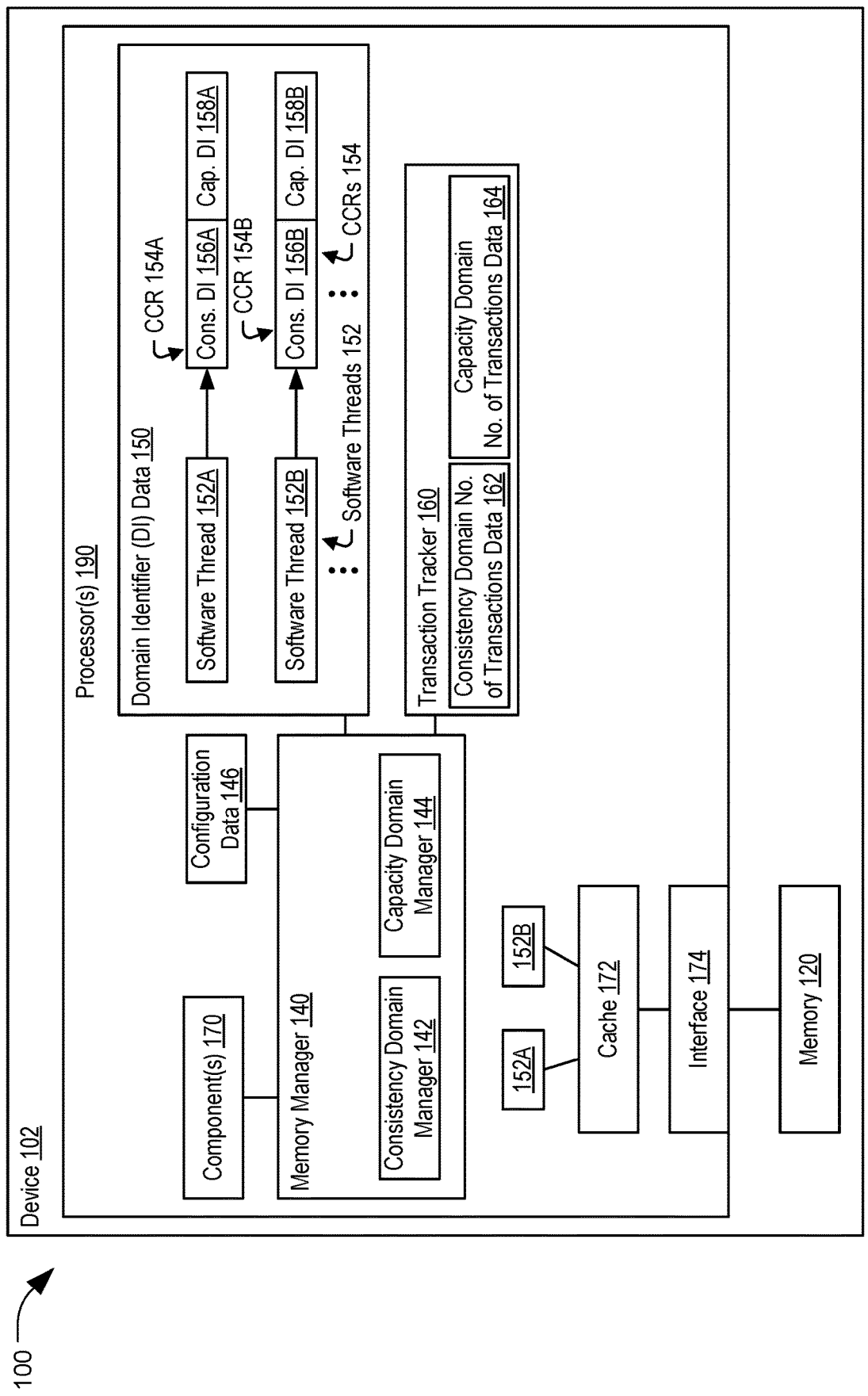
FIG. 1 is a block diagram of a particular illustrative aspect of a system operable to manage memory transactions, in accordance with some examples of the present disclosure.

Data read from memory or to be written to memory can be stored in a buffer. Buffer resources are consumed as software threads make memory requests. Software threads stall when no buffer resources are available for a memory transaction. Some data may stay longer in the buffer for a software thread that takes longer to consume or process the data. Slower traffic can congest the system and block memory requests from other software threads, resulting in delays and reduced quality of service.

Synchronization operations can be used to enforce ordering. When a typical synchronization operation is performed, all pending transactions have to be completed before any subsequent data access operations can be performed. This can lead to software threads being stalled for long periods.

System and methods of memory transaction management are disclosed. For example, a memory manager assigns domain identifiers to software threads. A domain identifier is assigned to a software thread based on a thread type of the software thread. The thread type can be based on an application, an application type, a device, a device type, a traffic type, or a combination thereof, associated with the thread. As an illustrative example, the memory manager assigns a first domain identifier to a first software thread based on a thread type of the first software thread, and a second domain identifier to a second software thread based on a thread type of the second software thread. The memory manager tracks a number (e.g., count) of memory transactions associated with each of the first domain identifier and the second domain identifier. The memory manager controls operation of one or more components of a processor based on the number of memory transactions associated with a domain identifier.

In some implementations, a synchronization instruction is used to enforce consistency (e.g., ordering of data access) for a software thread. As an illustrative example, the first domain identifier assigned to the first software thread includes a first consistency domain identifier, and the second domain identifier assigned to the second software thread includes a second consistency domain identifier. In response to receiving a synchronization instruction of the first software thread, any pending store operations associated with the first consistency domain identifier are completed prior to performing any subsequent data access instruction associated with the first consistency domain identifier, thereby enforcing consistency for the first software thread. For example, assigning the first consistency domain identifier to a software thread of a first application enables enforcing consistency for the software thread of the first application independently of software threads of other applications.

In some examples, some consistency domain identifiers (e.g., sub-domain identifiers) that are not the same as the first consistency domain identifier can match the first consistency domain identifier. In these examples, responsive to the synchronization instruction, any pending store operations associated with the first consistency domain identifier or the second consistency domain identifier are completed prior to performing any subsequent data access instruction associated with the first consistency domain identifier or the second consistency domain identifier if the second consistency domain identifier matches the first consistency domain identifier.

Data access instructions associated with consistency domain identifiers that do not match the first consistency domain identifier are not affected (e.g., not delayed) by the synchronization instruction associated with the first software thread. To illustrate, data access instructions associated with the second software thread are not delayed by the synchronization instruction if the second consistency domain identifier does not match the first consistency domain identifier.

Controlling the operation of one or more components of the processor includes, in response to receiving the synchronization instruction, completing any pending store operations associated with any consistency domain identifier that matches the first consistency domain identifier prior to performing any subsequent data access instruction associated with any consistency domain identifier that matches the first consistency domain. Any subsequent data access instruction associated with any consistency domain identifier that matches the first consistency domain is thus performed after a number of prior pending memory transactions associated with any consistency domain identifier that matches the first consistency domain identifier is zero, while subsequent data access instructions associated with consistency domain identifiers that do not match the first consistency domain identifier are not similarly delayed.

In some implementations, up to a threshold count of memory access instructions associated with a domain identifier can be pending at any time so that some resources can be available for memory access instructions associated with other domain identifiers. As an illustrative example, the first domain identifier assigned to the first software thread includes a first capacity domain identifier, and the second domain identifier assigned to the second software thread includes a second capacity domain identifier. The first capacity domain identifier is associated with a first threshold count. A memory access instruction from the first software thread is selectively enabled in response to determining that a count of pending memory access instructions associated with the first capacity domain identifier is less than the first threshold count. In these implementations, controlling the operation of one or more components of the processor includes selectively enabling the memory access instruction based on capacity limits. Limiting the count of pending memory access instructions associated with a capacity domain identifier can enable resources to be available for memory access instructions associated with other non-matching capacity domain identifiers. For example, assigning the first capacity domain identifier to a software thread of a first application enables enforcing resource limitations for the first application independently of resource limits for other applications.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 190 of FIG. 1), which indicates that in some implementations the device 102 includes a single processor 190 and in other implementations the device 102 includes multiple processors 190.

In some drawings, multiple instances of a particular type of feature are used. Although these features are physically and/or logically distinct, the same reference number is used for each, and the different instances are distinguished by addition of a letter to the reference number. When the features as a group or a type are referred to herein, e.g., when no particular one of the features is being referenced, the reference number is used without a distinguishing letter. However, when one particular feature of multiple features of the same type is referred to herein, the reference number is used with the distinguishing letter. For example, referring to FIG. 1, multiple cache control registers (CCRs) are illustrated and associated with reference numbers 154A and 154B. When referring to a particular one of these cache control registers, such as a cache control register (CCR) 154A, the distinguishing letter "A" is used. However, when referring to any arbitrary one of these cache control registers or to these cache control registers as a group, the reference number 154 is used without a distinguishing letter.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system 100 configured to manage memory transactions is disclosed. The system 100 includes a device 102 that is configured to manage memory transactions using a memory manager 140.

The device 102 includes one or more processors 190 coupled to a memory 120. In a particular aspect, the memory 120 includes data storage, a memory controller, or both. In some aspects, a cache 172 (e.g., a memory buffer) is coupled via an interface 174 to the memory 120. The one or more processors 190 include the memory manager 140 and one or more components 170. In some aspects, the one or more components 170 include one or more of the cache 172, the interface 174, the memory 120, a data bus, a modem, an antenna, an instruction buffer, or a coprocessor (e.g., a graphics processing unit (GPU), a digital signal processor (DSP), or another type of processor). The memory manager 140 has access to configuration data 146, domain identifier data 150, a transaction tracker 160, or a combination thereof. The memory manager 140 includes a consistency domain manager 142, a capacity domain manager 144, or both.

The transaction tracker 160 is configured to track consistency domain number of transactions data 162, capacity domain number of transactions data 164, or both. In a particular aspect, the consistency domain number of transactions data 162 indicates numbers (e.g., counts) of transactions associated with each of one or more consistency domain identifiers 156. In a particular aspect, the capacity domain number of transactions data 164 indicates numbers (e.g., counts) of transactions associated with each of one or more capacity domain identifiers 158.

The memory manager 140 is configured to assign distinct domain identifiers (e.g., a consistency domain identifier 156, a capacity domain identifier 158, or both) to each of a plurality of software threads 152. In some aspects, a process (e.g., an application) executing at the one or more processors 190 initializes a software thread 152. In some aspects, the software thread 152 corresponds to a database worker thread. For example, the software thread 152 receives data access requests from another process or device, and services the data access requests by sending memory access instructions to the memory manager 140.

The memory manager 140 is configured to manage memory transactions of the one or more software threads 152 based on the domain identifiers. For example, the consistency domain manager 142 is configured to manage memory transactions based on the consistency domain number of transactions data 162. As another example, the capacity domain manager 144 is configured to manage memory transactions based on the capacity domain number of transactions data 164. In some examples, the memory transactions include one or more of reading data from the memory 120 via the interface 174 to the cache 172, providing data from the cache 172 to a software thread 152, updating data in the cache 172 based on data received from the software thread 152, or writing updated data from the cache 172 via the interface 174 to the memory 120. In some aspects, controlling operation of the one or more components 170 includes, or corresponds to, performing the memory transactions.

In some implementations, the device 102 corresponds to or is included in one of various types of devices. In an illustrative example, the one or more processors 190 are integrated in a headset device, such as described further with reference to FIG. 19. In other examples, the one or more processors 190 are integrated in at least one of a mobile phone or a tablet computer device, as described with reference to FIG. 18, a wearable electronic device, as described with reference to FIG. 20, a voice-controlled speaker system, as described with reference to FIG. 21, a camera device, as described with reference to FIG. 22, or a virtual reality, mixed reality, or augmented reality headset, as described with reference to FIG. 23. In another illustrative example, the one or more processors 190 are integrated into a vehicle, such as described further with reference to FIG. 24 and FIG. 25.

During operation, the memory manager 140 assigns distinct domain identifiers to each of one or more software threads 152 based on corresponding thread types. For example, a software thread of a first thread type is assigned a domain identifier having a particular prefix (e.g., "00"), and a software thread of a second thread type is assigned a domain identifier having another prefix (e.g., "01"). A thread type of a software thread can be based on an application, an application type, a device, a device type, a traffic type, or a combination thereof, associated with the software thread.

In some implementations, a cache control register 154 associated with a software thread 152 indicates a consistency domain identifier 156, a capacity domain identifier 158, or both, assigned to the software thread 152. For example, during initialization of a software thread 152A, the consistency domain manager 142 updates a cache control register 154A associated with the software thread 152A to indicate that a consistency domain identifier 156A is assigned to the software thread 152A. In some aspects, the capacity domain manager 144, during initialization of the software thread 152A, updates the cache control register 154A to indicate that a capacity domain identifier 158A is assigned to the software thread 152A.

Similarly, during initialization of a software thread 152B, the consistency domain manager 142 updates a cache control register 154B associated with the software thread 152B to indicate that the consistency domain identifier 156B is assigned to the software thread 152B. The consistency domain identifier 156A is distinct from the consistency domain identifier 156B. In some aspects, the capacity domain manager 144, during initialization of the software thread 152B, updates the cache control register 154B to indicate that a capacity domain identifier 158B is assigned to the software thread 152B. The capacity domain identifier 158A is distinct from the capacity domain identifier 158B.

In a particular aspect, the domain identifier data 150 of FIG. 1 represents the cache control register 154A indicating that the consistency domain identifier 156A, the capacity domain identifier 158A, or both, are assigned to the software thread 152A. In a particular aspect, the domain identifier data 150 of FIG. 1 represents the cache control register 154B indicating that the consistency domain identifier 156B, the capacity domain identifier 158B, or both, are assigned to the software thread 152B.

The memory manager 140 manages memory transactions based at least in part on whether the software thread 152A and the software thread 152B have matching domain identifiers, as further described with reference to FIGS. 2-15. For example, the consistency domain manager 142 manages memory transactions based at least in part on whether the consistency domain identifier 156A matches the consistency domain identifier 156B, as further described with reference to FIGS. 2 and 4-15. To illustrate, the consistency domain manager 142, in response to a store associated with the software thread 152A being committed, updates (e.g., increments) the consistency domain number of transactions data 162 to indicate a pending store operation associated with the consistency domain identifier 156A, as further described with reference to FIG. 5. The consistency domain manager 142, in response to receiving a synchronization instruction of the software thread 152A and determining that the consistency domain number of transactions data 162 indicates at least one pending store operation that matches the consistency domain identifier 156A, refrains from performing any subsequent memory access instructions that match the consistency domain identifier 156A, as further described with reference to FIGS. 6-7. The consistency domain manager 142 determines that a pending store operation "matches" the consistency domain identifier 156A in response to determining that the pending store operation is associated with a consistency domain identifier (e.g., the consistency domain identifier 156A or another consistency domain identifier) that matches the consistency domain identifier 156A, as further described with reference to FIG. 2. The consistency domain manager 142 updates (e.g., decrements) the consistency domain number of transactions data 162 in response to receiving an acknowledgement from the memory 120 that the pending store operation has been completed, as further described with reference to FIG. 8.

In some aspects, the consistency domain manager 142, in response to determining that there are no pending store operations that match the consistency domain identifier 156A subsequent to receiving the synchronization instruction of the software thread 152A, enables subsequent memory access operations associated with any consistency domain identifiers (e.g., the consistency domain identifier 156A or another consistency domain identifier) that match the consistency domain identifier 156A to be performed.

In some examples, the capacity domain manager 144 manages memory transactions associated with the software thread 152A and the software thread 152B based at least in part on whether the capacity domain identifier 158A matches the capacity domain identifier 158B, as further described with reference to FIGS. 3 and 16-17. To illustrate, the capacity domain number of transactions data 164 indicates a count of pending memory accesses that match the capacity domain identifier 158A. In some aspects, a pending memory access "matches" the capacity domain identifier 158A when the pending memory access is associated with a capacity domain identifier (e.g., the capacity domain identifier 158A or another capacity domain identifier) that matches the capacity domain identifier 158A. The capacity domain manager 144, in response to receiving a memory access instruction from the software thread 152A, determines whether the count of pending memory accesses is greater than or equal to a threshold count, as further described with reference to FIGS. 16-17. The capacity domain manager 144, in response to determining that the count of pending memory accesses is less than the threshold count, initiates a memory access associated with the memory access instruction and updates (e.g., increments) the count of memory accesses indicated by the capacity domain number of transactions data 164. Alternatively, the capacity domain manager 144, in response to determining that the count of pending memory accesses is greater than or equal to the threshold count, refrains from performing the memory access. The capacity domain manager 144 updates (e.g., decrements) the capacity domain number of transactions data 164 in response to receiving an acknowledgement that a pending memory access is complete, as further described with reference to FIGS. 16-17.

The capacity domain manager 144 limits a count of pending memory accesses that match a capacity domain identifier to enable resources to be available for memory accesses associated with other non-matching capacity domain identifiers. The consistency domain manager 142 ensures that a synchronization instruction associated with a particular consistency domain identifier does not affect (e.g., delay) memory access instructions associated with other consistency domain identifiers that do not match the particular consistency domain identifier.

The memory manager 140 is described as managing memory transactions for the memory 120 that is included in the device 102 as an illustrative example. In other examples, the memory manager 140 can perform similar operations, based on domain identifiers, to manage transactions for another component of the device 102 or to manage transactions for another device. In an illustrative example, the memory manager 140 manages data transactions with (e.g., data storage to or retrieval from) an external device based on the consistency domain identifiers 156, the capacity domain identifiers 158, or a combination thereof.

Figure 2:
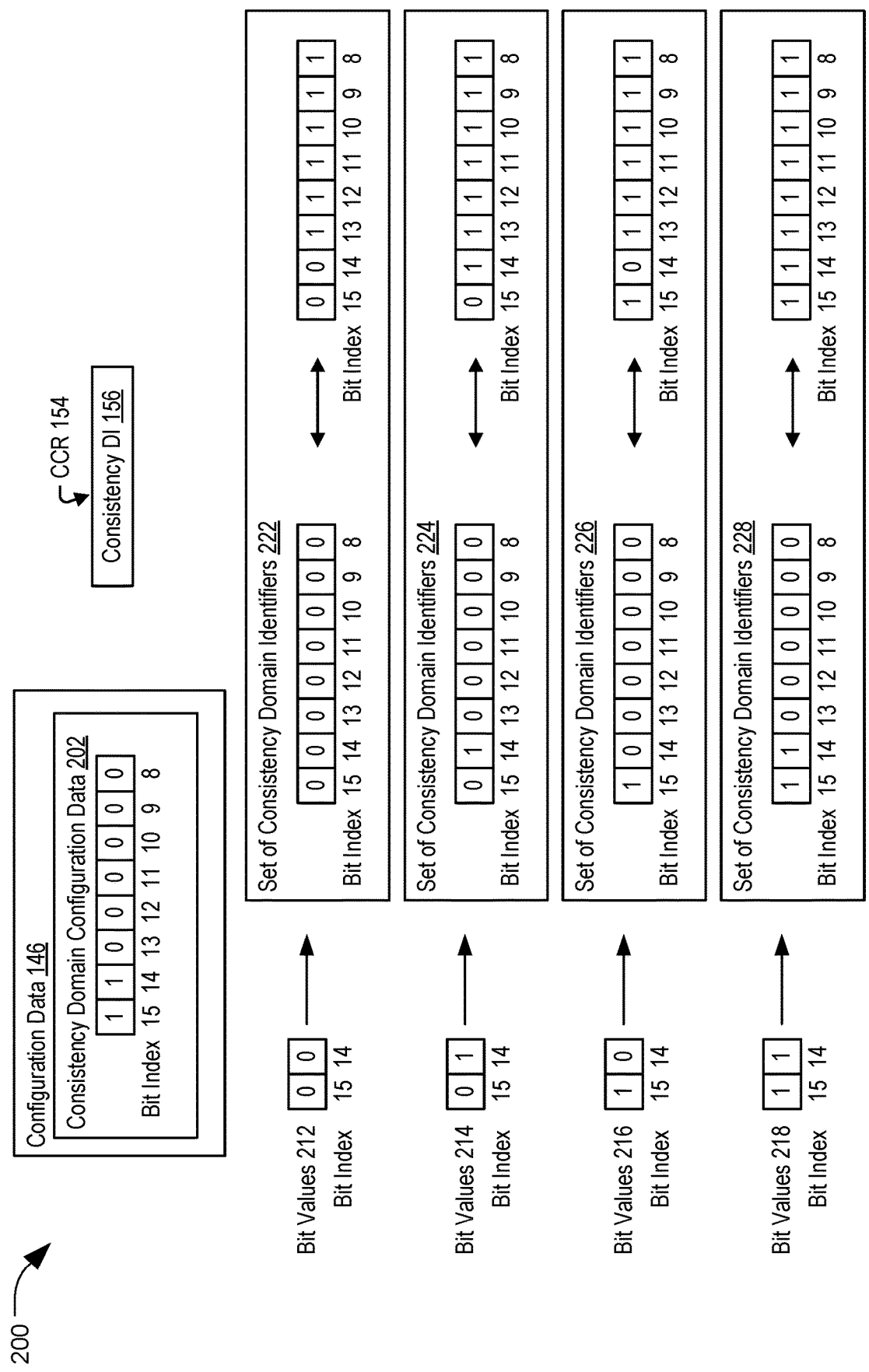
FIG. 2 is a diagram of an example of consistency domain configuration data of the system of FIG. 1, in accordance with some examples of the present disclosure.

Referring to FIG. 2, an example of consistency domain configuration data 202 is shown, along with multiple sets of consistency domain identifiers 222-228 based on the consistency domain configuration data 202. In a particular aspect, the consistency domain configuration data 202 is included in the configuration data 146 of FIG. 1. The consistency domain configuration data 202 can be implemented as a collection of bits (e.g., a bitmask) in which "1" values designate which bits are compared when determining whether two or more consistency domain identifiers 156 "match" each other, as described further below.

Each cache control register 154 includes a first count of bits (e.g., 32 bits) from a least significant bit (e.g., bit 0) to a most significant bit (e.g., bit 31). In some aspects, a first set of bits (e.g., bit 8 to bit 15) of a cache control register 154 associated with a software thread 152 can be used to indicate a consistency domain identifier 156 assigned to the software thread 152.

In some implementations, the first set of bits (e.g., bit 8 to bit 15) of cache control registers 154 indicates multiple sets of consistency domain identifiers that can be used to define domains or sub-domains of consistency domain identifiers. The consistency domain configuration data 202 indicates bits of the cache control registers 154 that are implemented for indicating sets of consistency domain identifiers. To illustrate, the consistency domain configuration data 202 indicates that a first subset (e.g., bit 14 to bit 15) of the first set of bits (e.g., bit 8 to bit 15) of cache control registers 154 is implemented for indicating sets of consistency domain identifiers. For example, the first subset (e.g., bit 14 to bit 15) of bits of a particular consistency domain identifier 156 indicates a set of consistency domain identifiers that includes that particular consistency domain identifier 156.

In a particular aspect, a count of bits (e.g., 2) of the first subset indicates a count of sets of consistency domain identifiers (e.g., $2^{(count\ of\ bits)}$ or 4 sets) that are supported. For example, bit values 212 of the first subset (e.g., a value of 0 for each of bit 15 and bit 14) indicate a set of consistency domain identifiers 222 (e.g., binary 00000000 to 00111111 or decimal 0 to 63). Bit values 214 of the first subset (e.g., a value of 0 for bit 15 and a value of 1 for bit 14) indicate a set of consistency domain identifiers 224 (e.g., binary 01000000 to 01111111 or decimal 64 to 127). Bit values 216 of the first subset (e.g., a value of 1 for bit 15 and a value of 0 for bit 14) indicate a set of consistency domain identifiers 226 (e.g., binary 10000000 to 10111111 or decimal 128 to 195). Bit values 218 of the first subset (e.g., a value of 1 for each of bit 15 and bit 14) indicate a set of consistency domain identifiers 228 (e.g., binary 11000000 to 11111111 or decimal 196 to 255). In the illustrated example, the first subset includes 2 bits that can support four sets of consistency domain identifiers. However, in other examples, the first subset can include any count of bits that support a corresponding count of sets of consistency domain identifiers (e.g., the first subset including 3 bits can support 8 sets of consistency domain identifiers, etc.).

In some implementations, each set of consistency domain identifiers corresponds to a respective consistency domain. In these implementations, two or more consistency domain identifiers "match" each other if they have the same bit values for the first subset (e.g., bit 14 to bit 15). For example, the consistency domain identifier 156A matches the consistency domain identifier 156B if each of the consistency domain identifier 156A and the consistency domain identifier 156B has the same bit values of the first subset (e.g., bit 14 to bit 15). To illustrate, the consistency domain identifier 156A matches the consistency domain identifier 156B if both of the consistency domain identifier 156A and the consistency domain identifier 156B are included in the same one of the set of consistency domain identifiers 222 (e.g., decimal 0 to 63), the set of consistency domain identifiers 224 (e.g., decimal 64 to 127), the set of consistency domain identifiers 226 (e.g., decimal 128 to 195), or the set of consistency domain identifiers 228 (e.g., decimal 196 to 255).

In an example in which the consistency domain identifier 156A has a first value "4" and the consistency domain identifier 156B has a second value "6," the consistency domain identifier 156A having the first value (e.g., decimal 4) included in the set of consistency domain identifiers 222 (e.g., decimal 0 to 63) matches the consistency domain identifier 156B having the second value (e.g., decimal 6) that is also included in the set of consistency domain identifiers 222. In an example in which the consistency domain identifier 156A has a first value "4" and the consistency domain identifier 156B has a second value "125," the consistency domain identifier 156A having the first value (e.g., decimal 4) included in the set of consistency domain identifiers 222 (e.g., decimal 0 to 63) does not match the consistency domain identifier 156B having the second value (e.g., decimal 125) that is not included in the set of consistency domain identifiers 222.

In some implementations, one or more of the consistency domains can include multiple sets of consistency domain identifiers. For example, a first consistency domain includes the set of consistency domain identifiers 222 (e.g., decimal 0 to 63) and the set of consistency domain identifiers 224 (e.g., decimal 64 to 127). A second consistency domain includes the set of consistency domain identifiers 226 (e.g., decimal 128 to 195) and the set of consistency domain identifiers 228 (e.g., decimal 196 to 255). In this example, the first consistency domain corresponds to a value of 0 for bit 15, and the second consistency domain corresponds to a value of 1 for bit 15. In some implementations, a consistency domain identifier 156A (e.g., decimal 3) included in the first consistency domain (e.g., decimal 0 to 127) matches a consistency domain identifier 156B (e.g., decimal 70) included in the first consistency domain. However, a consistency domain identifier 156A (e.g., decimal 3) included in the first consistency domain (e.g., decimal 0 to 127) does not match a consistency domain identifier 156B (e.g., decimal 129) that is not included in the first consistency domain.

In some aspects, the consistency domain manager 142 assigns domain identifiers from the first consistency domain (e.g., decimal 0 to 127) to software threads 152 associated with a first thread type, and assigns domain identifiers from the second consistency domain (e.g., decimal 128 to 255) to software threads 152 associated with a second thread type. A thread type of a software thread 152 can be based on an application, an application type, a device, a device type, a traffic type, or a combination thereof, associated with the software thread 152. In a particular aspect, traffic type can include communication traffic type, such as cellular traffic, wireless local-area network (WLAN) traffic, Bluetooth® (a registered trademark of BLUETOOTH SIG, INC., Washington) traffic, fifth generation (5G) cellular digital network, Institute of Electrical and Electronic Engineers (IEEE) 802.11-type network (e.g., WiFi) traffic, or other types of communication traffic. As an example, the first thread type is associated with cellular modem traffic and the second thread type is associated with WLAN traffic. Assigning consistency domain identifiers from the first consistency domain (e.g., decimal 0 to 127) to software threads 152 associated with cellular modem traffic, and assigning consistency domain identifiers from the second consistency domain (e.g., decimal 128 to 255) to software threads 152 associated with the WLAN traffic enables segregation of cellular modem traffic and WLAN traffic. For example, cellular modem memory transactions are not blocked by synchronization operations associated with WLAN memory transactions, and vice versa.

In some implementations, a consistency domain can be divided into sub-domains. For example, the first consistency domain can include a first sub-domain including the set of consistency domain identifiers 222 (e.g., decimal 0 to 63) and a second sub-domain including the set of consistency domain identifiers 224 (e.g., decimal 64 to 127). In some aspects, the second consistency domain includes the set of consistency domain identifiers 226 (e.g., 128 to 195) and the set of consistency domain identifiers 228 (e.g., 196 to 255) that are not divided into sub-domains.

In some implementations, a consistency domain identifier 156A (e.g., decimal 3) included in the first sub-domain (e.g., decimal 0 to 63) matches a consistency domain identifier 156B (e.g., decimal 62) included in the first sub-domain. However, a consistency domain identifier 156A (e.g., decimal 3) included in the first sub-domain (e.g., decimal 0 to 63) does not match a consistency domain identifier 156B (e.g., decimal 70) that is not included in the first sub-domain. For example, a consistency domain identifier 156A included in the first sub-domain (e.g., decimal 0 to 63) of the first consistency domain does not match a consistency domain identifier 156B included in a second sub-domain (e.g., decimal 64 to 127) of the first consistency domain.

In some aspects, the consistency domain manager 142 assigns consistency domain identifiers 156 from the first sub-domain (e.g., decimal 0 to 63) to software threads 152 associated with a first thread sub-type of the first thread type, and assigns consistency domain identifiers 156 from the second sub-domain (e.g., decimal 64 to 127) to software threads 152 associated with a second thread sub-type of the first thread type. A thread sub-type of a software thread 152 can be based on an application, an application type, a device, a device type, a traffic type, or a combination thereof, associated with the software thread 152. For example, the first thread sub-type is associated with cellular modem traffic from the device 102 to a first device, and the second thread sub-type is associated with cellular modem traffic from the device 102 to a second device.

Assigning consistency domain identifiers 156 from the first sub-domain (e.g., decimal 0 to 63) to software threads 152 associated with the cellular modem traffic to the first device, and assigning consistency domain identifiers from the second sub-domain (e.g., decimal 64 to 127) to software threads 152 associated with cellular modem traffic to the second device enables segregation between cellular modem traffic to the first device and cellular modem traffic to the second device. For example, cellular modem memory transactions associated with the first device are not blocked by synchronization operations associated with cellular modem memory transactions associated with the second device, and vice versa. Thus, in some implementations, matching is determined at the sub-domain level rather than at the domain level.

In some implementation, matching can be determined at the domain level or at the sub-domain level. For example, a particular value (e.g., 0) of a consistency domain identifier 156A can be used to indicate that a synchronization operation is associated with an entire domain as compared to one of the sub-domains. In some aspects, the particular value (e.g., 0) is reserved to indicate the entire domain and is not included in any sub-domain. In a particular example, a consistency domain identifier 156A (e.g., decimal 0) is used to indicate a first consistency domain that includes a first sub-domain (e.g., decimal 1 to 63) and a second sub-domain (e.g., decimal 64 to 127). For example, a consistency domain identifier 156B (e.g., decimal 1 to 63 of the first sub-domain) matches the consistency domain identifier 156A (e.g., decimal 0 indicating the first consistency domain) to block cellular modem memory transactions of the first sub-domain during a synchronization operation associated with the consistency domain identifier 156A. As another example, a consistency domain identifier 156B (e.g., decimal 64 to 127 of the second sub-domain) also matches the consistency domain identifier 156A (e.g., decimal 0 indicating the first consistency domain) to block cellular modem memory transactions of the second sub-domain during a synchronization operation associated with the consistency domain identifier 156A.

Subsequent cellular modem memory transactions associated with both the first device and the second device are blocked by a synchronization operation associated with the consistency domain identifier 156A indicating the first consistency domain. When memory transactions of a sub-domain are to be blocked, a synchronization operation associated with a consistency domain identifier indicating the sub-domain (and not the entire domain) can be used. For example, a synchronization operation associated with a consistency domain identifier 156A (e.g., decimal 1 to 63) corresponding to the first sub-domain blocks subsequent memory transactions of the first sub-domain while not blocking memory transactions of the second sub-domain. As another example, a synchronization operation associated with a consistency domain identifier 156A (e.g., decimal 64 to 127) corresponding to the second sub-domain blocks subsequent memory transactions of the second sub-domain while not blocking memory transactions of the first sub-domain.

Figure 3:
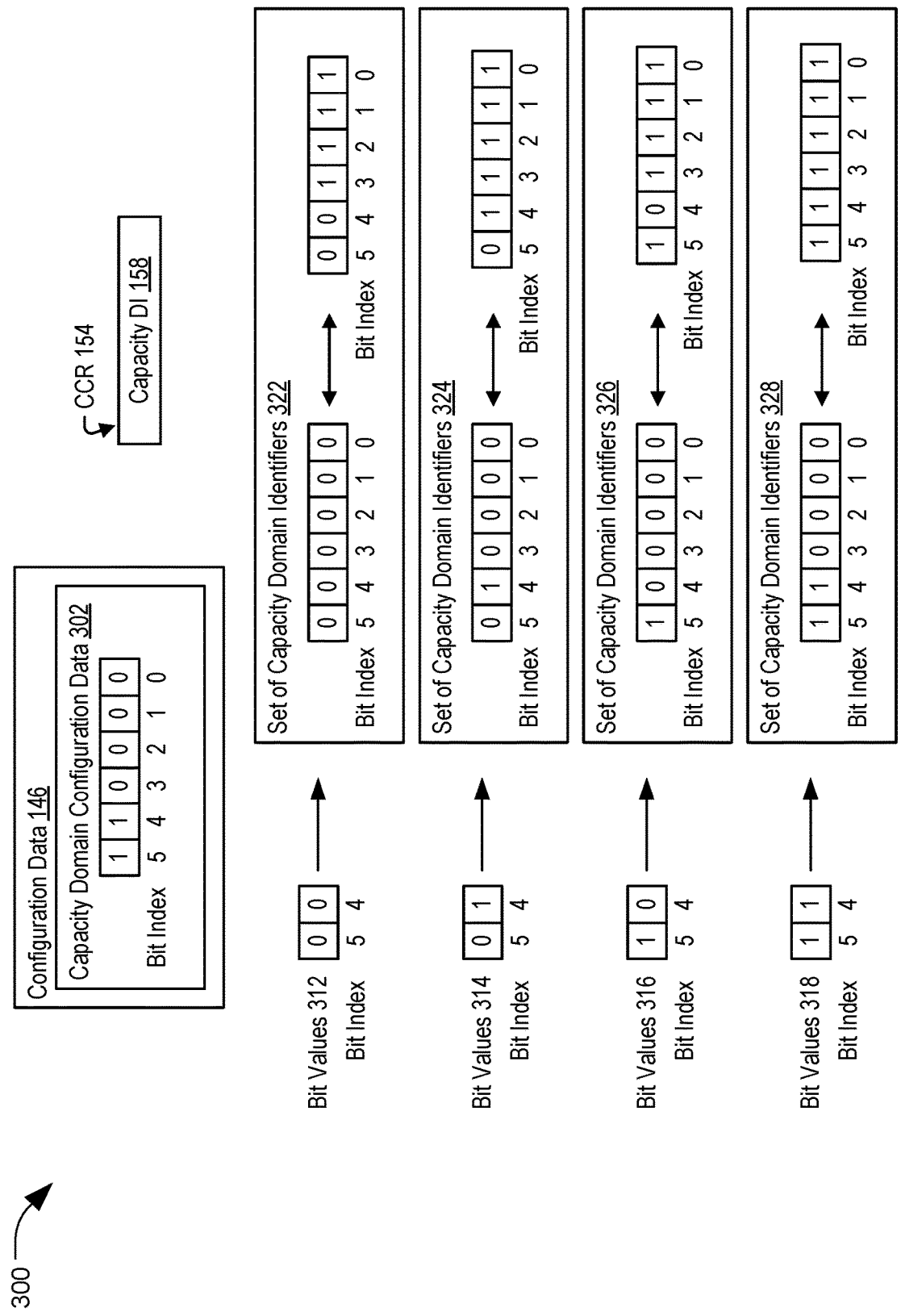
FIG. 3 is a diagram of an example of capacity domain configuration data of the system of FIG. 1, in accordance with some examples of the present disclosure.

Referring to FIG. 3, an example of capacity domain configuration data 302 is shown, along with multiple sets of capacity domain identifiers 322-328 based on the capacity domain configuration data 302. In a particular aspect, the capacity domain configuration data 302 is included in the configuration data 146 of FIG. 1. The capacity domain configuration data 302 can be implemented as a collection of bits (e.g., a bitmask) in which "1" values designate which bits are compared when determining whether two or more capacity domain identifiers 158 "match" each other, as described further below.

In some aspects, a second set of bits (e.g., bit 0 to bit 5) of the cache control register 154 can be used to indicate a capacity domain identifier 158 assigned to the software thread 152. In some implementations, the second set of bits (e.g., bit 0 to bit 5) of cache control registers 154 indicate multiple sets of capacity domain identifiers that can be used to define domains or sub-domains of capacity domain identifiers. The capacity domain configuration data 302 indicates bits of the cache control registers 154 that are implemented for indicating sets of capacity domain identifiers. To illustrate, capacity domain configuration data 302 indicates that a second subset (e.g., bit 4 to bit 5) of the second set of bits (e.g., bit 0 to bit 5) of cache control registers 154 is implemented for indicating sets of capacity domain identifiers. For example, the second subset (e.g., bit 4 to bit 5) of a capacity domain identifier 158 indicates a set of capacity domain identifiers that includes the capacity domain identifier 158.

In a particular aspect, a count of bits (e.g., 2) of the second subset indicates a count of sets of capacity domain identifiers (e.g., $2^{(count\ of\ bits)}$ or 4 sets) that are supported. For example, bit values 312 of the second subset (e.g., a value of 0 for each of bit 5 and bit 4) indicate a set of capacity domain identifiers 322 (e.g., binary 000000 to 001111 or decimal 0 to 15). Bit values 314 of the second subset (e.g., a value of 0 for bit 5 and a value of 1 for bit 4) indicate a set of capacity domain identifiers 324 (e.g., binary 010000 to 011111 or decimal 16 to 31). Bit values 316 of the second subset (e.g., a value of 1 for bit 5 and a value of 0 for bit 4) indicate a set of capacity domain identifiers 326 (e.g., binary 100000 to 101111 or decimal 32 to 47). Bit values 318 of the second subset (e.g., a value of 1 for each of bit 5 and bit 4) indicate a set of capacity domain identifiers 328 (e.g., binary 110000 to 111111 or decimal 48 to 63). The second subset including 2 bits that can support four sets of capacity domain identifiers is provided as an illustrative example. In other examples, the second subset can include any count of bits that support a corresponding count of sets of capacity domain identifiers. The second subset (e.g., bit 4 to bit 5) of a capacity domain identifier 158 including the same count (e.g., 2) of bits as included in the first subset (e.g., bit 14 to bit 15) of a consistency domain identifier 156 is provided as an illustrative example. In other examples, the second subset can include fewer or more bits than included in the first subset. The capacity domain identifiers are used to enforce resource utilization limits, whereas the consistency domain identifiers are used to enforce synchronization.

In some implementations, each set of capacity domain identifiers corresponds to a respective capacity domain. In these implementations, two or more capacity domain identifiers "match" each other if they have the same bit values for the second subset (e.g., bit 4 to bit 5). For example, the capacity domain identifier 158A matches the capacity domain identifier 158B if each of the capacity domain identifier 158A and the capacity domain identifier 158B has the same bit values of the second subset (e.g., bit 4 to bit 5). To illustrate, the capacity domain identifier 158A matches the capacity domain identifier 158B if both of the capacity domain identifier 158A and the capacity domain identifier 158B are included in the same one of the set of capacity domain identifiers 322 (e.g., decimal 0 to 15), the set of capacity domain identifiers 324 (e.g., decimal 16 to 31), the set of capacity domain identifiers 326 (e.g., decimal 32 to 47), or the set of capacity domain identifiers 328 (e.g., decimal 48 to 63).

In an example in which the capacity domain identifier 158A has a first value "4" and the capacity domain identifier 158B has a second value "6," the capacity domain identifier 158A having the first value (e.g., decimal 4) included in the set of capacity domain identifiers 322 (e.g., decimal 0 to 15) matches the capacity domain identifier 158B having the second value (e.g., decimal 6) that is also included in the set of capacity domain identifiers 322. In an example in which the capacity domain identifier 158A has a first value "4" and the capacity domain identifier 158B has a second value "18," the capacity domain identifier 158A having the first value (e.g., decimal 4) included in the set of capacity domain identifiers 322 (e.g., decimal 0 to 15) does not match the capacity domain identifier 158B having the second value (e.g., decimal 18) that is not included in the set of capacity domain identifiers 322.

In some implementations, one or more of the capacity domains can include multiple sets of domain identifiers. For example, a first capacity domain includes the set of capacity domain identifiers 322 (e.g., decimal 0 to 15) and the set of capacity domain identifiers 324 (e.g., decimal 16 to 31). A second capacity domain includes the set of capacity domain identifiers 326 (e.g., decimal 32 to 47) and the set of capacity domain identifiers 328 (e.g., decimal 48 to 63). In this example, the first capacity domain corresponds to a value of 0 for bit 5, and the second capacity domain corresponds to a value of 1 for bit 5. In some implementations, a capacity domain identifier 158A (e.g., decimal 3) included in the first capacity domain (e.g., decimal 0 to 31) matches a capacity domain identifier 158B (e.g., decimal 17) included in the first capacity domain. However, a capacity domain identifier 158A (e.g., decimal 3) included in the first capacity domain (e.g., decimal 0 to 31) does not match a capacity domain identifier 158B (e.g., 41) that is not included in the first capacity domain.

In some aspects, the capacity domain manager 144 assigns capacity domain identifiers from the first capacity domain (e.g., decimal 0 to 31) to software threads 152 associated with a first thread type, and assigns domain identifiers from the second capacity domain (e.g., decimal 32 to 63) to software threads 152 associated with a second thread type. For example, the first thread type is associated with cellular modem traffic and the second thread type is associated with wireless local-area network (WLAN) traffic. Assigning capacity domain identifiers from the first capacity domain (e.g., decimal 0 to 31) to software threads 152 associated with cellular modem traffic, and assigning capacity domain identifiers from the second capacity domain (e.g., decimal 32 to 63) to software threads 152 associated with the WLAN traffic enables separate capacity limits for cellular modem traffic and WLAN traffic. For example, cellular modem memory transactions are not blocked by too many WLAN memory transactions, and vice versa.

In some implementations, a capacity domain can be divided into sub-domains. For example, the first capacity domain can include a first sub-domain including the set of capacity domain identifiers 322 (e.g., decimal 0 to 15) and a second sub-domain including the set of capacity domain identifiers 324 (e.g., decimal 16 to 31). In some aspects, the second capacity domain includes the set of capacity domain identifiers 326 (e.g., 32 to 47) and the set of capacity domain identifiers 328 (e.g., 48 to 63) that are not divided into sub-domains.

In some implementations, a capacity domain identifier 158A (e.g., decimal 3) included in the first sub-domain (e.g., decimal 0 to 15) matches a capacity domain identifier 158B (e.g., decimal 6) included in the first sub-domain. However, a capacity domain identifier 158A (e.g., decimal 3) included in the first sub-domain (e.g., decimal 0 to 15) does not match a capacity domain identifier 158B (e.g., decimal 17) that is not included in the first sub-domain. For example, a capacity domain identifier 158A included in the first sub-domain (e.g., decimal 0 to 15) of the first capacity domain does not match a capacity domain identifier 158B included in a second sub-domain (e.g., decimal 16 to 31) of the first capacity domain.

In some aspects, the capacity domain manager 144 assigns capacity domain identifiers 158 from the first sub-domain (e.g., decimal 0 to 15) to software threads 152 associated with a first thread sub-type of the first thread type, and assigns capacity domain identifiers 158 from the second sub-domain (e.g., decimal 16 to 31) to software threads 152 associated with a second thread sub-type of the first thread type. For example, the first thread sub-type is associated with cellular modem traffic of a first device, and the second thread sub-type is associated with cellular modem traffic of a second device.

Assigning capacity domain identifiers 158 from the first sub-domain (e.g., decimal 0 to 15) to software threads 152 associated with the cellular modem traffic of the first device, and assigning capacity domain identifiers from the second sub-domain (e.g., decimal 16 to 31) to software threads 152 associated with cellular modem traffic of the second device enables separate capacity limits for cellular modem traffic of the first device and cellular modem traffic of the second device. For example, cellular modem memory transactions of the first device are not blocked by too many cellular modem memory transactions of the second device, and vice versa. Thus, in some implementations, matching is determined at the sub-domain level rather than at the domain level.

In some implementation, matching can be determined at the domain level or at the sub-domain level. For example, a particular value (e.g., 0) of a capacity domain identifier 158A can be used to indicate an entire domain as compared to one of the sub-domains. In some aspects, the particular value (e.g., 0) is reserved to indicate the entire domain and is not included in any sub-domain. In a particular example, a capacity domain identifier 158A (e.g., decimal 0) is used to indicate a first capacity domain that includes a first sub-domain (e.g., decimal 1 to 15) and a second sub-domain (e.g., decimal 16 to 31). For example, a capacity domain identifier 158B (e.g., decimal 1 to 15 of the first sub-domain) matches the capacity domain identifier 158A (e.g., decimal 0 indicating the first capacity domain). As another example, a capacity domain identifier 158B (e.g., decimal 16 to 31 of the second sub-domain) also matches the capacity domain identifier 158A (e.g., decimal 0 indicating the first capacity domain).

In some examples, the first capacity domain is associated with a domain threshold count (e.g., 8), the first sub-domain is associated with a first sub-domain threshold count (e.g., 5), and the second sub-domain is associated with a second sub-domain threshold count (e.g., 5). For example, the first sub-domain traffic is limited if either the capacity limit of the first sub-domain is reach or the capacity limit of the first capacity domain is reached. To illustrate, the first sub-domain traffic can be limited when a count of pending memory accesses associated with the first capacity domain (e.g., 3 first sub-domain pending memory accesses and 5 second sub-domain memory accesses) is equal to the domain threshold count (e.g., 8) although a count (e.g., 3) of pending memory accesses associated with the first sub-domain is less than the first sub-domain threshold count (e.g., 5). In some implementations, when a domain threshold count is different from a sum of sub-domain threshold counts, a sub-domain threshold corresponds to a maximum capacity limit for the sub-domain instead of a guaranteed capacity limit.

Figure 5:
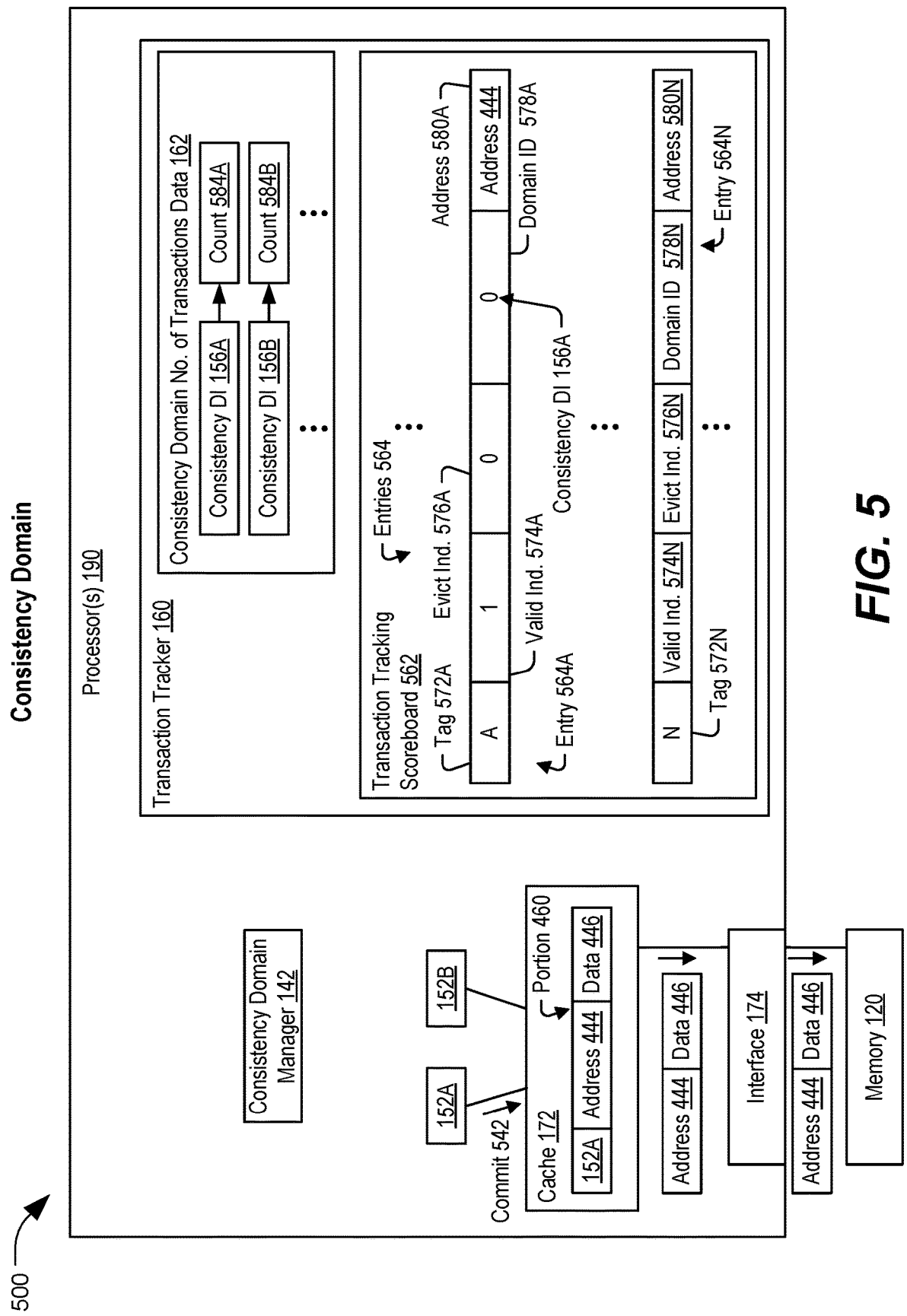
FIG. 5 is a diagram of an illustrative aspect of the system of FIG. 1, in accordance with some examples of the present disclosure.

FIGS. 4A-4C illustrate examples of updating the cache 172 responsive to a write instruction from a software thread 152A. FIG. 5 illustrates an example of updating the transaction tracker 160 to indicate a pending store associated with a consistency domain identifier 156A of the software thread 152A. For example, the pending store of FIG. 5 can be associated with data in the cache 172 that is updated responsive to the write instruction in the examples of FIGS. 4A-4C.

Referring to FIG. 4A, in an example 400, a software thread 152A sends a write instruction 440 indicating an opcode 442, an address 444, and data 446. The opcode 442 (e.g., an identifier) indicates that the write instruction 440 corresponds to a memory write instruction.

The write instruction 440 indicates that the data 446 is to be written to the address 444 of the memory 120. The memory manager 140 of FIG. 1, in response to receiving the write instruction 440 indicating the address 444 and determining that data associated with the address 444 is not available in the cache 172, initiates a load 452 of data from the address 444 of the memory 120. In some aspects, the memory manager 140 initiates the load 452 in response to determining that the consistency domain manager 142 indicates that the consistency domain identifier 156A does not match any consistency domain identifier associated with a pending synchronization operation, as further described with reference to FIGS. 5-8, and that the capacity domain manager 144 indicates that the capacity domain identifier 158A does not match any capacity domain identifier that has a count of pending memory accesses that have reached a corresponding threshold count, as further described with reference to FIGS. 16-17.

In an example 490 of FIG. 4B, data 448 stored at the address 444 is received via the interface 174 from the memory 120 and stored in a portion 460 of the cache 172. For example, the memory manager 140 receives the data 448 and stores the data 448 in the portion 460.

In some implementations, the memory manager 140 also updates metadata of the portion 460 to indicate the software thread 152A and the address 444. For example, the metadata indicates that the portion 460 includes data associated with the address 444 and is associated with a memory access of the software thread 152A. In some implementations, the metadata includes a dirty bit, and the memory manager 140 updates the metadata to set the dirty bit to a first value (e.g., 0) to indicate that the portion 460 includes data read from the memory 120 that has not been updated in the cache 172.

In an example 492 of FIG. 4C, the memory manager 140 replaces (e.g., overwrites) the data 448 with the data 446 of the write instruction 440. In some implementations, the memory manager 140 updates the dirty bit to a second value (e.g., 1) to indicate that the portion 460 includes data that has been updated in the cache 172.

The write instruction 440 is provided as an example of a memory access instruction of the software thread 152A. A read instruction can be another example of a memory access instruction of the software thread 152A. The read instruction can include an opcode and an address. The memory manager 140, in response to receiving the read instruction of the software thread 152A, loads the data from the address of the memory 120 to a portion of the cache 172 and sets a dirty bit (e.g., metadata) of the portion to a first value (e.g., 0) to indicate that the portion stores data that is retrieved from the memory 120 and that has not been updated in the cache 172.

Referring to FIG. 5, a system 500 operable to manage memory transactions is disclosed. In a particular aspect, the system 100 of FIG. 1 may include one or more components of the system 500.

The transaction tracker 160 includes a transaction tracking scoreboard 562 that is configured to track one or more pending stores associated with the one or more consistency domain identifiers 156. The transaction tracking scoreboard 562 includes a plurality of entries 564, such as an entry 564A, one or more additional entries, an entry 564N, or a combination thereof. Each of the plurality of entries 564 includes a tag field 572, a valid indicator field 574, an eviction indicator field 576, a domain identifier field 578, and an address field 580.

The tag field 572 of an entry 564 indicates an identifier of the entry 564. For example, a tag field 572A of the entry 564A includes an identifier (e.g., A) of the entry 564A. As another example, a tag field 572N of the entry 564N includes an identifier (e.g., N) of the entry 564N.

The valid indicator field 574 of an entry 564 indicates whether the entry 564 includes valid data. For example, a first value (e.g., 0) of the valid indicator field 574 indicates that the entry 564 includes invalid data, whereas a second value (e.g., 1) of the valid indicator field 574 indicates that the entry 564 includes valid data.

The eviction indicator field 576 of an entry 564 is used to indicate a pending eviction to an address indicated by the address field 580. For example, a first value (e.g., 0) of the eviction indicator field 576 indicates no pending eviction, whereas a second value (e.g., 1) of the eviction indicator field 576 indicates a pending eviction.

The domain identifier field 578 of an entry 564 is used to indicate one or more consistency domain identifiers 156 associated with the entry 564. In some aspects, the consistency domain number of transactions data 162 corresponds to a count of pending transactions associated with a consistency domain identifier 156. The count of pending transactions can be determined based on a count of entries 564 including valid data (e.g., as indicated by the valid indicator field 574) that are associated with the consistency domain identifier 156 (e.g., as indicated by the domain identifier field 578).

The software thread 152A issues a commit 542 subsequent to the write instruction 440 of the example 400 of FIG. 4A. In a particular aspect, the consistency domain manager 142, in response to determining that the portion 460 of the cache 172 includes data associated with the software thread 152A (e.g., as indicated by metadata) and that the portion 460 includes updated data (e.g., as indicated by a dirty bit), determines that a store corresponding to the software thread 152A and associated with the portion 460 is being committed. Alternatively, if a second portion of the cache 172 includes data associated with the software thread 152A that has not been updated in the cache 172 (e.g., as indicated by the dirty bit), the consistency domain manager 142 determines that no store associated with the second portion (e.g., corresponding to a read instruction) is being committed.

The consistency domain manager 142, in response to a store corresponding to the software thread 152A and associated with the portion 460 being committed, updates an entry 564A to indicate a pending store operation associated with the portion 460. For example, the consistency domain manager 142 updates the address field 580A to indicate the address 444 associated with the portion 460. The consistency domain manager 142 updates the domain identifier field 578A to indicate the consistency domain identifier 156A (e.g., 0) assigned to the software thread 152A that is associated with the portion 460. The consistency domain manager 142 sets the eviction indicator field 576A to a first value (e.g., 0) to indicate no pending eviction. The consistency domain manager 142 updates the valid indicator field 574A to a second value (e.g., 1) to indicate that the entry 564A includes valid data.

The consistency domain manager 142, subsequent to updating the entry 564A, initiates a store of the data 446 to the address 444. For example, the consistency domain manager 142 causes the data 446 to be provided via the interface 174 to the memory 120 for storage at the address 444.

The transaction tracking scoreboard 562 indicates the consistency domain number of transactions data 162. For example, the consistency domain number of transactions data 162 indicates counts 584 of pending stores associated with consistency domain identifiers 156. In some implementations, the consistency domain manager 142 increments (e.g., by 1) a count 584A of pending stores associated with the consistency domain identifier 156A concurrently with updating the entry 564A, initiating the store of the data 446, or both. In some implementations, the count 584A is indicated by a count of valid entries (e.g., as indicated by the valid indicator field 574) of the transaction tracking scoreboard 562 that are associated with the consistency domain identifier 156A (e.g., as indicated by the domain identifier field 578).

Figure 7:
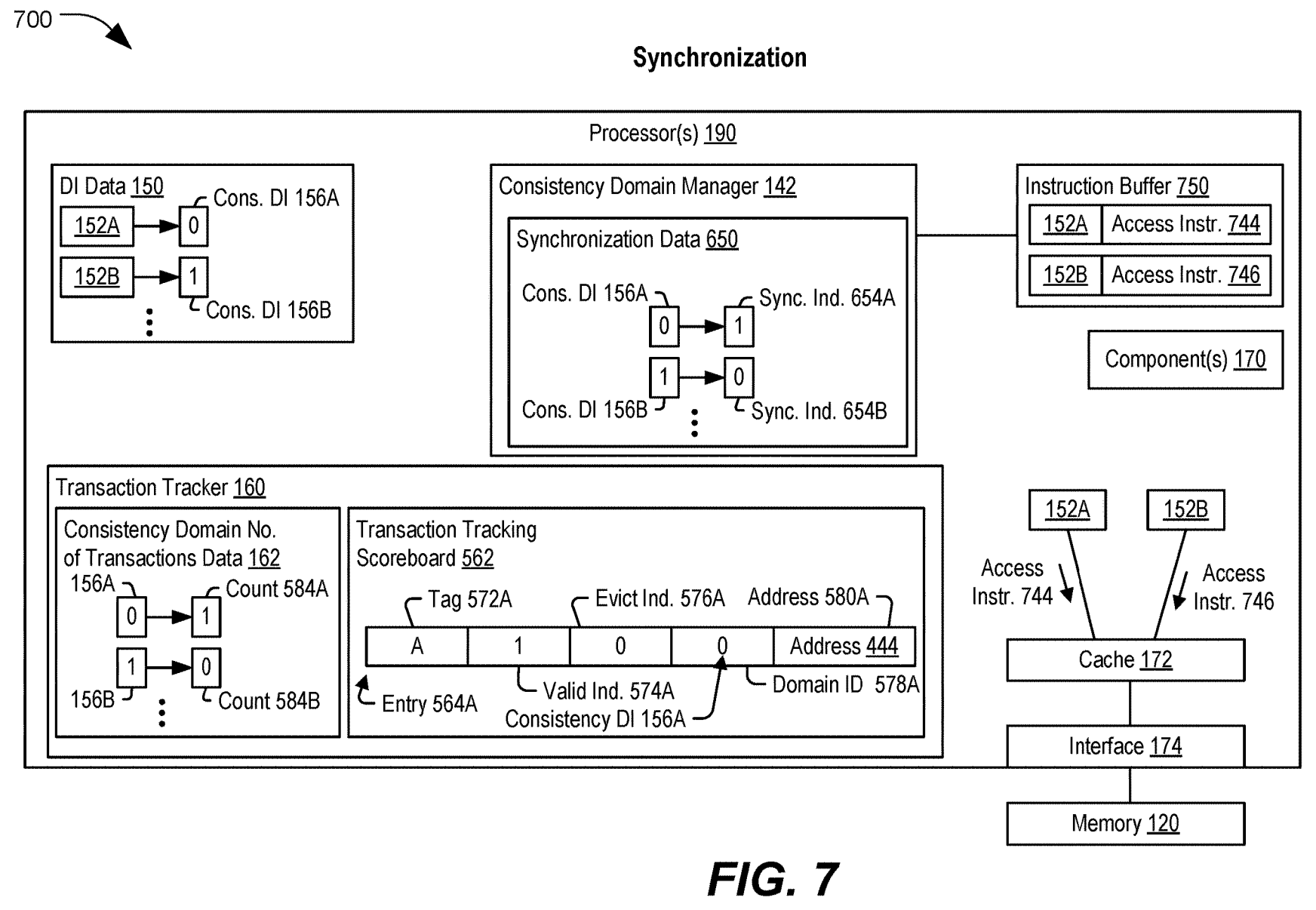
Figure 8:
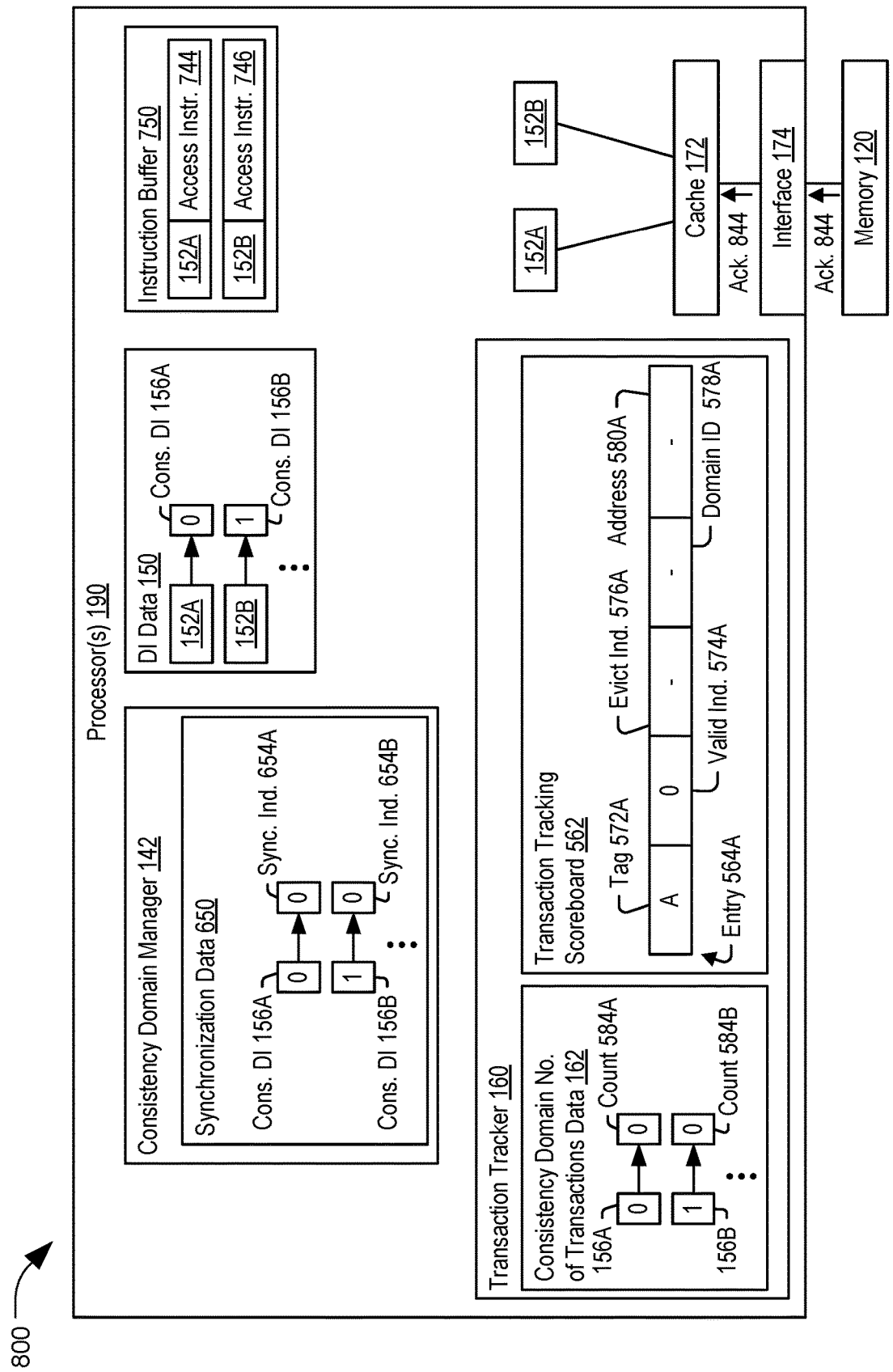
FIG. 8 is a diagram of an illustrative aspect of the system of FIG. 1, in accordance with some examples of the present disclosure.

Operations that may be performed in the event of a synchronization operation are described with reference to a system 600 of FIG. 6, a system 700 of FIG. 7, and a system 800 of FIG. 8. Each of the system 600, the system 700, and the system 800 is operable to manage memory transactions and may include one or more components that are included in the system 100 of FIG. 1. In particular, FIG. 6 illustrates an example of initiation of a synchronization operation of the software thread 152A, FIG. 7 illustrates examples of receiving access instructions during the synchronization operation, and FIG. 8 illustrates an example of completing the pending store and the synchronization operation.

Figure 6:
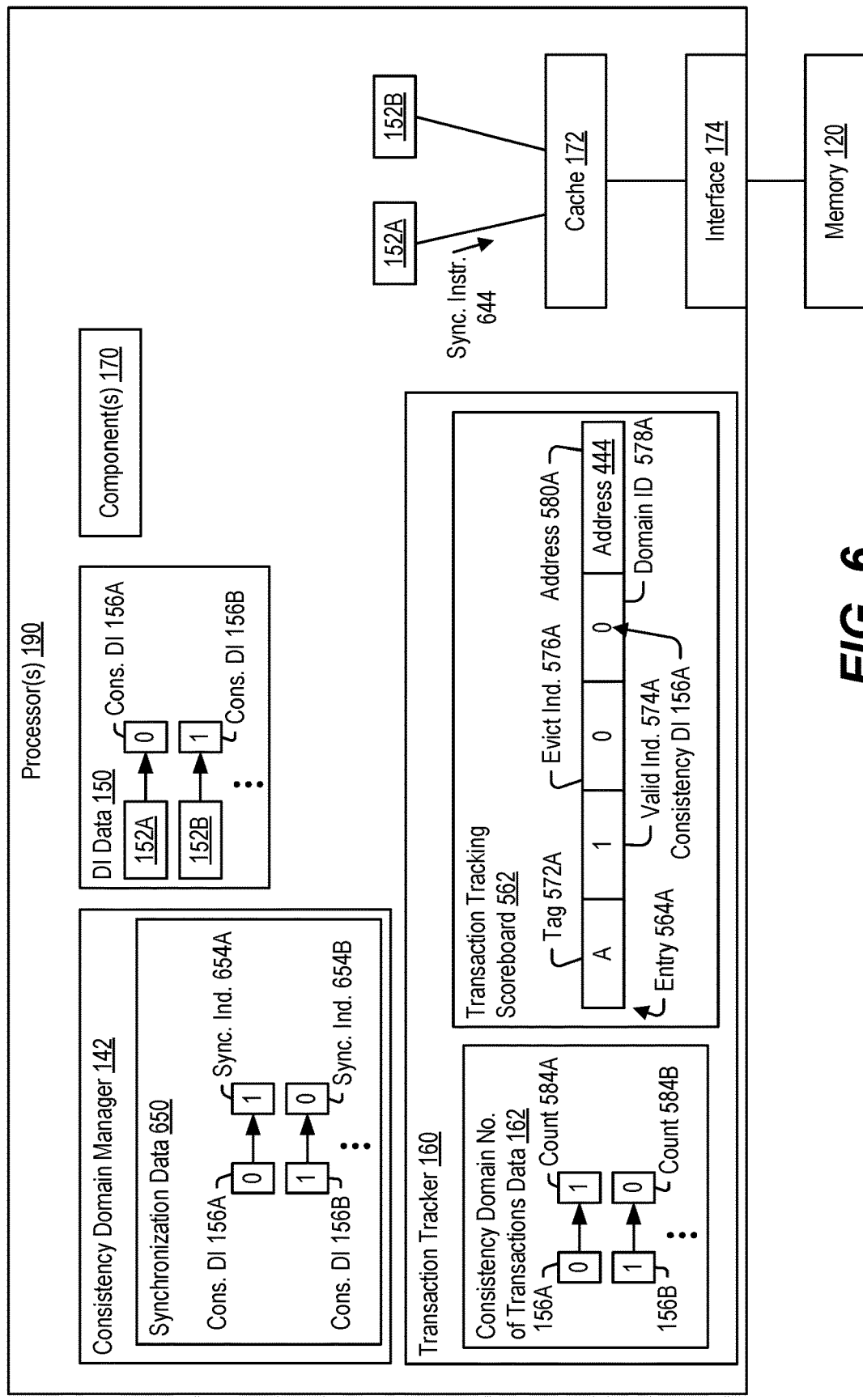
FIG. 6 is a diagram of an illustrative aspect of the system of FIG. 1, in accordance with some examples of the present disclosure.

In FIG. 6, the consistency domain manager 142 includes or has access to synchronization data 650 indicating whether a synchronization operation associated with the one or more consistency domain identifiers 156 is pending. For example, the synchronization data 650 includes a synchronization indicator 654 for each of the one or more consistency domain identifiers 156. To illustrate, the synchronization data 650 includes a synchronization indicator 654A and a synchronization indicator 654B for the consistency domain identifier 156A and the consistency domain identifier 156B, respectively. Each of the one or more synchronization indicators 654 is initialized to a first value (e.g., 0) to indicate that no pending synchronization operation is associated with the corresponding consistency domain identifier 156.

The software thread 152A initiates a synchronization operation by issuing a synchronization instruction 644. In some implementations, the synchronization instruction 644 corresponds to a barrier instruction or a store-release load-acquire instruction. The consistency domain manager 142, in response to receiving the synchronization instruction 644 of the software thread 152A and determining that domain identifier data 150 indicates that the software thread 152A is assigned to the consistency domain identifier 156A, updates a synchronization indicator 654A associated with the consistency domain identifier 156A to a second value (e.g., 1) to indicate a pending synchronization operation associated with the consistency domain identifier 156A.

In some implementations, the consistency domain manager 142 selectively updates the synchronization indicator 654A based on a count of pending stores that match the consistency domain identifier 156A. For example, the count of pending stores that match the consistency domain identifier 156A corresponds to a count of valid entries, such as the entry 564A, of the transaction tracking scoreboard 562 having a domain identifier field 578 indicating one or more consistency domain identifiers 156 that match the consistency domain identifier 156A. To illustrate, the consistency domain identifier 156A matches itself and the count of pending stores is based on the count 584A associated with the consistency domain identifier 156A. In an example, another consistency domain identifier (e.g., the consistency domain identifier 156B) also matches the consistency domain identifier 156A, as described with reference to FIG. 2, and the count of pending stores that match the consistency domain identifier 156A is also based on a count 584B of pending stores associated with the consistency domain identifier 156B. In this example, the count of pending stores that match the consistency domain identifier 156A is based on a sum of the count 584A and the count 584B.

In some implementations, the consistency domain manager 142, in response to determining that the count of pending stores that match the consistency domain identifier 156A is greater than zero, updates a synchronization indicator 654A associated with the consistency domain identifier 156A to a second value (e.g., 1) to indicate a pending synchronization operation associated with the consistency domain identifier 156A. The synchronization indicator 654A is thus set based on the consistency domain number of transactions data 162 to control operation of the one or more components 170, as further described with reference to FIGS. 7-8.

In FIG. 7, the consistency domain manager 142 receives an access instruction 744 (e.g., a read instruction or a write instruction) of the software thread 152A. The consistency domain manager 142, in response to determining that the software thread 152A is assigned the consistency domain identifier 156A (e.g., as indicated by the domain identifier data 150) and that the synchronization data 650 indicates that a pending synchronization operation is associated with the consistency domain identifier 156A, refrains from performing the access instruction 744. Controlling operation of the one or more components 170 includes refraining from performing the access instruction 744. In some aspects, refraining from performing the access instruction 744 includes adding the access instruction 744 of the software thread 152A to an instruction buffer 750 with a corresponding ready flag set to a first value (e.g., 0) to indicate that the access instruction 744 is not ready to be performed.

In a particular example, the consistency domain manager 142 receives an access instruction 746 from the software thread 152B, and determines that the consistency domain identifier 156B is assigned to the software thread 152B (e.g., as indicated by the domain identifier data 150). The consistency domain manager 142, in response to determining that the synchronization data 650 indicates that the consistency domain identifier 156A has a pending synchronization operation, determines whether the consistency domain identifier 156B matches the consistency domain identifier 156A, as described with reference to FIG. 2.

The consistency domain manager 142, in response to determining that the consistency domain identifier 156B matches the consistency domain identifier 156A, refrains from performing the access instruction 746. Controlling operation of the one or more components 170 includes refraining from performing the access instruction 746. In some aspects, refraining from performing the access instruction 746 includes adding the access instruction 746 of the software thread 152B to the instruction buffer 750 with a corresponding ready flag set to a first value (e.g., 0) to indicate that the access instruction 746 is not ready to be performed. Alternatively, the consistency domain manager 142, in response to determining that the consistency domain identifier 156B does not match any consistency domain identifier associated with a pending synchronization operation, initiates performance of the access instruction 746 or adds the access instruction 746 to the instruction buffer 750 with a corresponding ready flag set to a second value (e.g., 1) indicating that the access instruction 746 is ready to be performed.

The consistency domain manager 142 thus refrains from performing access instructions associated with consistency domain identifiers that match the consistency domain identifier 156A during a synchronization operation of the consistency domain identifier 156A. However, performance of access instructions associated with consistency domain identifiers that do not match the consistency domain identifier 156A is not blocked by the synchronization operation of the software thread 152A.

In FIG. 8, the memory 120 issues an acknowledgement (ack.) 844 indicating that storage of data to the address 444 is complete. The consistency domain manager 142, in response to receiving the acknowledgement 844, determines a consistency domain identifier associated with the address 444 and updates the transaction tracking scoreboard 562 to indicate that there is no pending store associated with the address 444. For example, the consistency domain manager 142 determines that the entry 564A is valid (e.g., as indicated by the valid indicator field 574A) and indicates that the address 444 (e.g., as indicated by the address field 580A) is associated with the consistency domain identifier 156A (e.g., as indicated by the domain identifier field 578A). The consistency domain manager 142 updates the valid indicator field 574A of the entry 564A to a first value (e.g., 0) to indicate that the entry 564A is invalid and that there is no pending store associated with the address 444. In some implementations, the consistency domain manager 142 decrements (e.g., by 1) the count 584A corresponding to the consistency domain identifier 156A that is associated with the address 444.

The consistency domain manager 142, in response to determining that the synchronization data 650 indicates a pending synchronization operation associated with the consistency domain identifier 156A (e.g., corresponding to the address 444 indicated by the acknowledgement 844), determines whether the transaction tracking scoreboard 562 indicates any remaining pending store operations that match the consistency domain identifier 156A. For example, the consistency domain manager 142 determines the count of pending stores that match the consistency domain identifier 156A based on the count 584A associated with the consistency domain identifier 156A. In some examples, another consistency domain identifier (e.g., the consistency domain identifier 156B) matches the consistency domain identifier 156A. In these examples, the consistency domain manager 142 determines the count of pending stores that match the consistency domain identifier 156A also based on the count 584B. For example, the count of pending stores that match the consistency domain identifier 156A is based on a sum of counts associated with consistency domain identifiers that match the consistency domain identifier 156A. The consistency domain manager 142, in response to determining that the count of pending stores that match the consistency domain identifier 156A is zero, updates the synchronization indicator 654A to a first value (e.g., 0) to indicate that the synchronization operation associated with the consistency domain identifier 156A is complete.

In a particular aspect, the consistency domain manager 142, in response to determining that the synchronization operation associated with the consistency domain identifier 156A is complete, designates one or more instructions in the instruction buffer 750 as ready to be performed. For example, the consistency domain manager 142 determines that the access instruction 744 included in the instruction buffer 750 is designated as not ready to be performed (e.g., as indicated by a ready flag). The consistency domain manager 142 determines that the access instruction 744 is associated with the software thread 152A that is assigned the consistency domain identifier 156A (e.g., as indicated by the domain identifier data 150). The consistency domain manager 142, in response to determining that the consistency domain identifier 156A does not match any consistency domain identifiers associated with a pending synchronization operation (e.g., as indicated by the synchronization data 650), designates the access instruction 744 as ready to be performed by setting the ready flag to a second value (e.g., 1). Similarly, in another example, the consistency domain manager 142 designates the access instruction 746 as ready to perform in response to determining that the consistency domain identifier 156B does not match any consistency domain identifiers associated with a pending synchronization operation.

The consistency domain manager 142, in response to receiving the synchronization instruction 644 of the software thread 152A, controls operation of the one or more components 170 of FIG. 1 based on the number (e.g., count) of pending stores that match the consistency domain identifier 156A. Controlling operation of the one or more components 170 includes completing any pending stores that match the consistency domain identifier 156A prior to performing any subsequent data access instruction associated with any consistency domain identifier that matches the consistency domain identifier 156A.

Figure 10A:
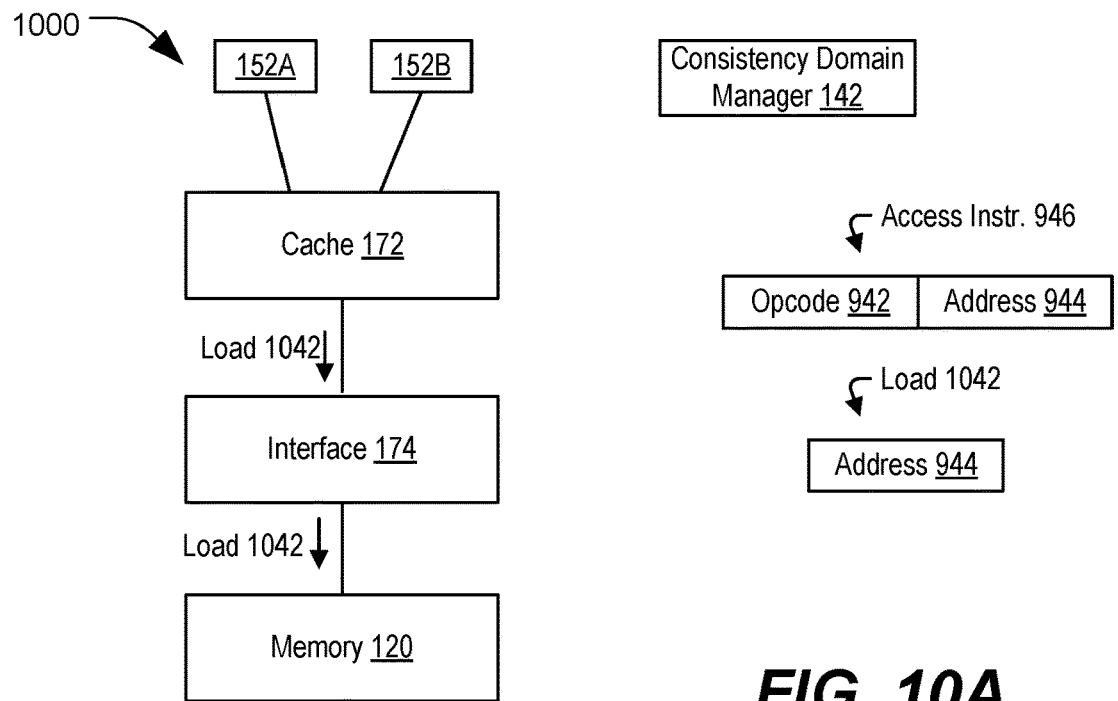
FIG. 10A is a diagram of an illustrative aspect of operation of the system of FIG. 1, in accordance with some examples of the present disclosure.
Figure 10B:
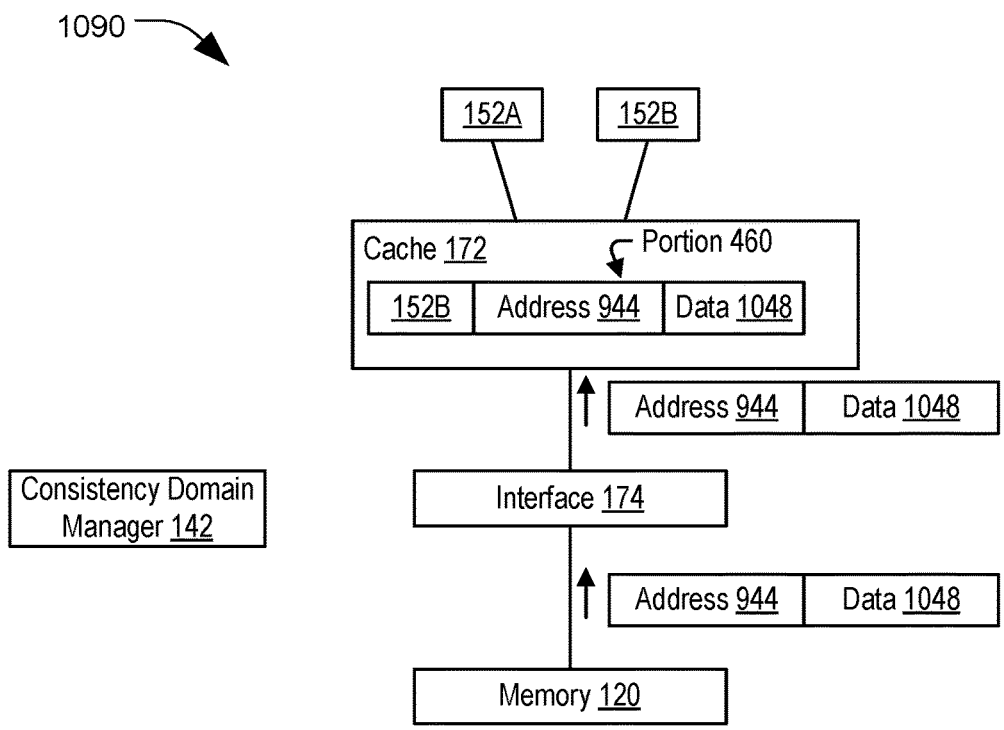
FIG. 10B is a diagram of an illustrative aspect of operation of the system of FIG. 1, in accordance with some examples of the present disclosure.
Figure 11:
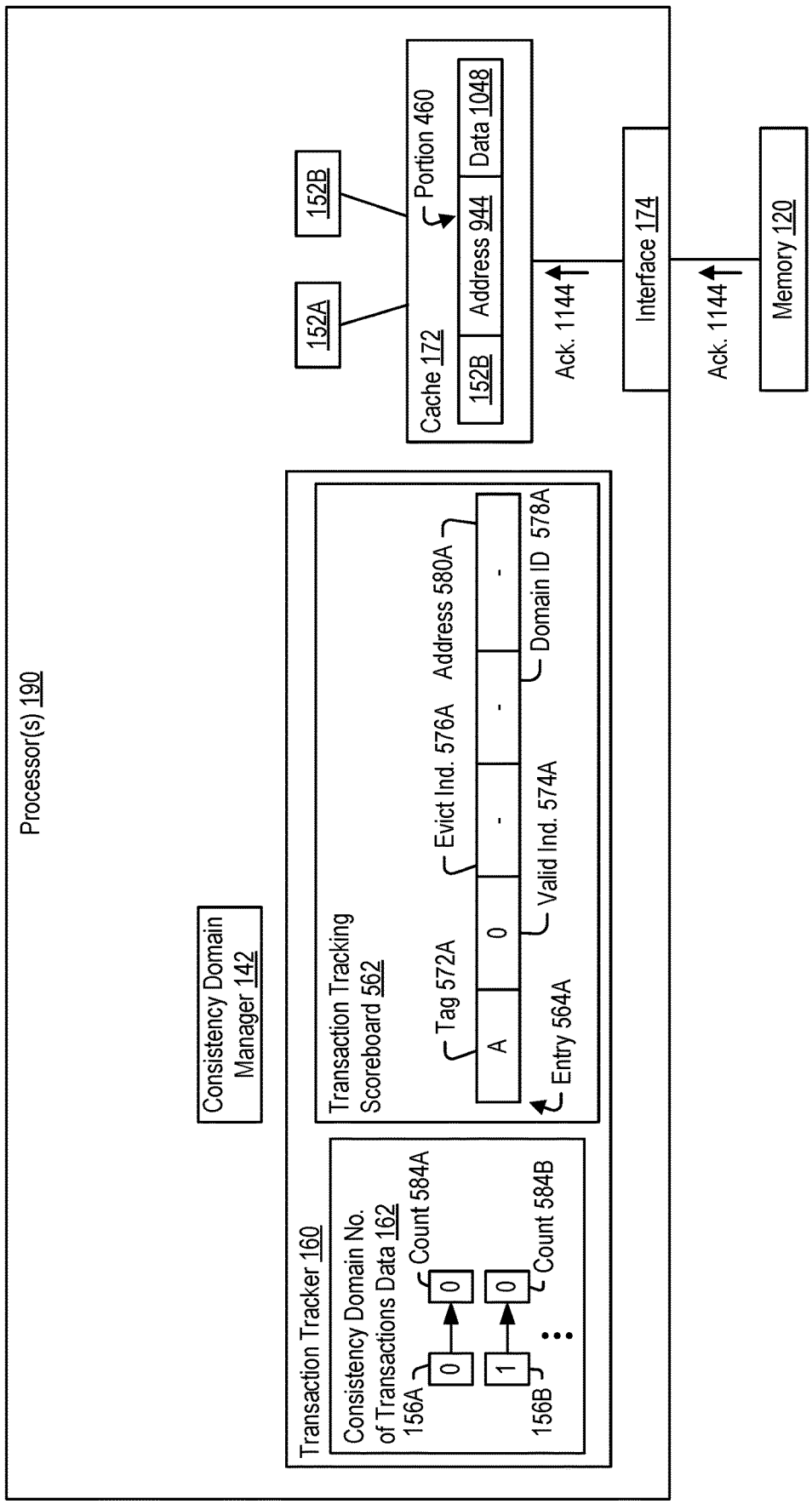
FIG. 11 is a diagram of an illustrative aspect of the system of FIG. 1, in accordance with some examples of the present disclosure.

Operations that may be performed in the event of a capacity eviction are described with reference to a system 900 of FIG. 9, an example 1000 of FIG. 10A, an example 1090 of FIG. 10B, and a system 1100 of FIG. 11. Each of the system 900 and the system 1100 is operable to manage memory transactions and may include one or more components that are included in the system 100 of FIG. 1. In particular, FIG. 9 illustrates an example of initiation of a capacity eviction of updated data from a portion of the cache 172 in response to a second memory access instruction, FIGS. 10A and 10B illustrate loading data corresponding to the second memory access instruction to the portion of the cache, and FIG. 11 illustrates an example of completing the capacity eviction in response to an acknowledgement that a store of the updated data is completed.

Figure 9:
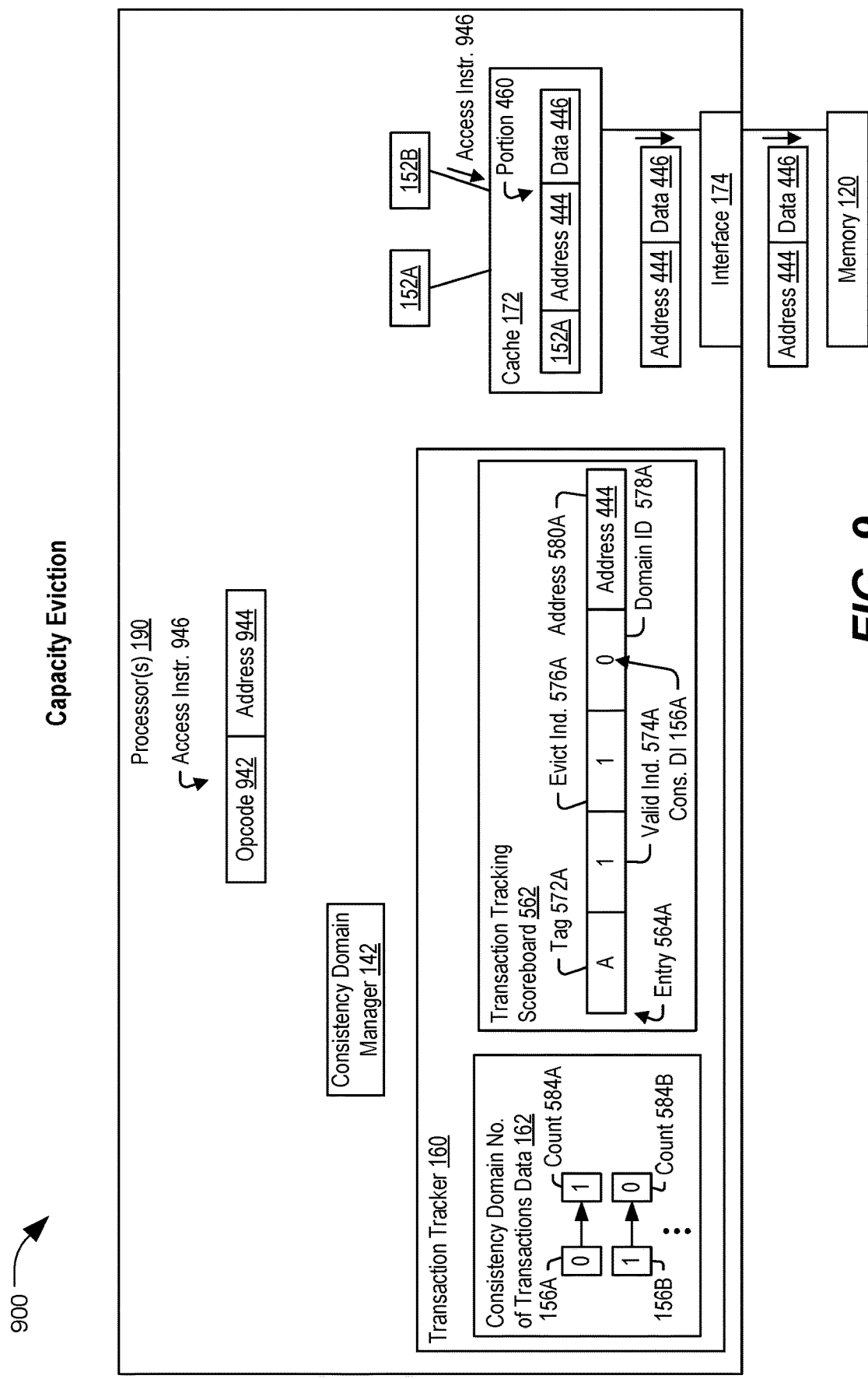
FIG. 9 is a diagram of an illustrative aspect of the system of FIG. 1, in accordance with some examples of the present disclosure.

In FIG. 9, the portion 460 of the cache 172 includes the data 446 of the software thread 152A that is updated in the cache 172 (e.g., as indicated by a dirty bit) and is associated with the address 444, as described with reference to FIG. 4C. The software thread 152B issues an access instruction 946 (e.g., a memory read instruction or a memory write instruction) indicating at least an opcode 942 and an address 944. For example, the opcode 942 includes an identifier of the access instruction 946. In a particular aspect, the access instruction 946 corresponds to a memory write instruction and also indicates data to be written to the address 944.

The consistency domain manager 142, in response to receiving the access instruction 946, determining that data corresponding to the address 944 is not available in the cache 172, and determining that the cache 172 is full, uses various cache eviction strategies (e.g., least recently accessed) to select the portion 460 of the cache 172 to store data corresponding to the address 944. If the selected portion (e.g., the portion 460) includes data that has not been updated in the cache 172 (e.g., as indicated by the dirty bit), the selected portion can be overwritten without an eviction. Alternatively, the consistency domain manager 142, in response to determining that the selected portion (e.g., the portion 460) includes data that has been updated in the cache 172 (e.g., as indicated by the dirty bit), initiates an eviction of the data 446 stored in the portion 460.

Initiating the eviction of the data 446 associated with the address 444 includes updating an available entry 564 (e.g., an invalid entry as indicated by the valid indicator field 574) of the transaction tracking scoreboard 562 and initiating a store of the data 446 to the address 444 of the memory 120. For example, the consistency domain manager 142 sets the address field 580A of the entry 564A to indicate the address 444 associated with the portion 460. The consistency domain manager 142 sets the eviction indicator field 576A to a second value (e.g., 1) to indicate a pending eviction. The consistency domain manager 142 sets the domain identifier field 578A of the entry 564A to indicate the consistency domain identifier 156A assigned to the software thread 152A that is associated with the portion 460. In some implementations, a pending eviction corresponds to a pending store associated with the consistency domain identifier 156A for a synchronization operation. For example, in some implementations, the consistency domain manager 142 updates (e.g., increments by 1) the count 584A corresponding to the consistency domain identifier 156A assigned to the software thread 152A. The consistency domain manager 142 sets the valid indicator field 574A to a second value (e.g., 1) to indicate that the entry 564A corresponds to a valid entry.

The consistency domain manager 142 initiates a store of the data 446 by causing the data 446 to be sent via the interface 174 to be written to the address 444 of the memory 120. The data from the address 944 is loaded to the portion 460 subsequent to the initiation of the store of the data 446. In the example 1000 of FIG. 10A, the consistency domain manager 142 initiates a load 1042 of data from the address 944 of the memory 120.

In the example 1090 of FIG. 10B, data 1048 stored at the address 944 is received via the interface 174 from the memory 120 and stored in the portion 460 of the cache 172. For example, the consistency domain manager 142 receives a notification that the data 1048 is stored in the portion 460.

In some implementations, the consistency domain manager 142 also updates metadata of the portion 460 to indicate the software thread 152B (associated with the access instruction 946) and the address 944. For example, the metadata indicates that the portion 460 includes data associated with the address 944 and is associated with a memory access of the software thread 152B. In some implementations, the metadata includes a dirty bit, and the memory manager 140 updates the metadata to set the dirty bit to a first value (e.g., 0) to indicate that the portion 460 includes data read from the memory 120 that has not been updated in the cache 172.

If the access instruction 946 corresponds to a write instruction and indicates updated data to be written to the address 944, the data 1048 is replaced (e.g., overwritten) with the updated data, and the metadata is updated to set the dirty bit to a second value (e.g., 1) to indicate that the portion 460 includes data that has been updated in the cache 172.

In FIG. 11, the memory 120 issues an acknowledgement (ack.) 1144 indicating that storage of data to the address 444 is complete. The consistency domain manager 142, in response to receiving the acknowledgement 1144, determining that the entry 564A is valid (e.g., as indicated by the valid indicator field 574A), and determining that the entry 564A is associated with the address 444 (e.g., as indicated by the address field 580A), updates the valid indicator field 574A to a first value (e.g., 0) to indicate that the entry 564A is invalid and that the pending eviction is completed. In some implementations, the consistency domain manager 142, in response to receiving the acknowledgement 1144 and prior to setting the valid indicator field 574A to the first value (e.g., 0), updates (e.g., decrements by 1) the count 584A corresponding to the consistency domain identifier 156A associated with the address 444 (e.g., as indicated by the domain identifier field 578A).

Operations that may be performed in the event of a cache operation hit are described with reference to a system 1200 of FIG. 12 and a system 1300 of FIG. 13. Each of the system 1200 and the system 1300 is operable to manage memory transactions and may include one or more components that are included in the system 100 of FIG. 1. In particular, FIG. 12 and FIG. 13 illustrate an example of initiation of a cache operation that corresponds to a hit in the cache 172 and an example of completing the cache operation, respectively.

Figure 12:
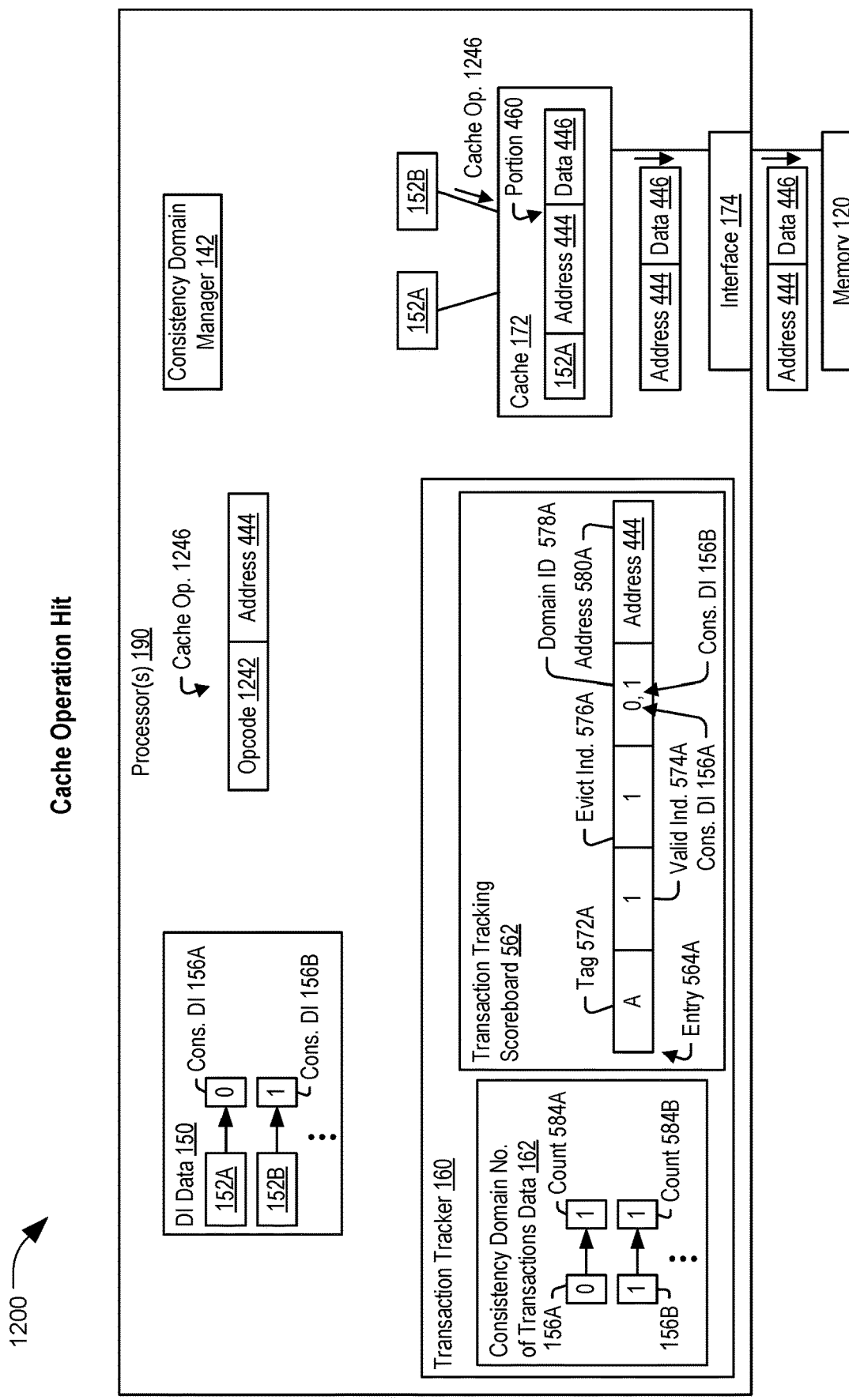
FIG. 12 is a diagram of an illustrative aspect of the system of FIG. 1, in accordance with some examples of the present disclosure.
Figure 13:
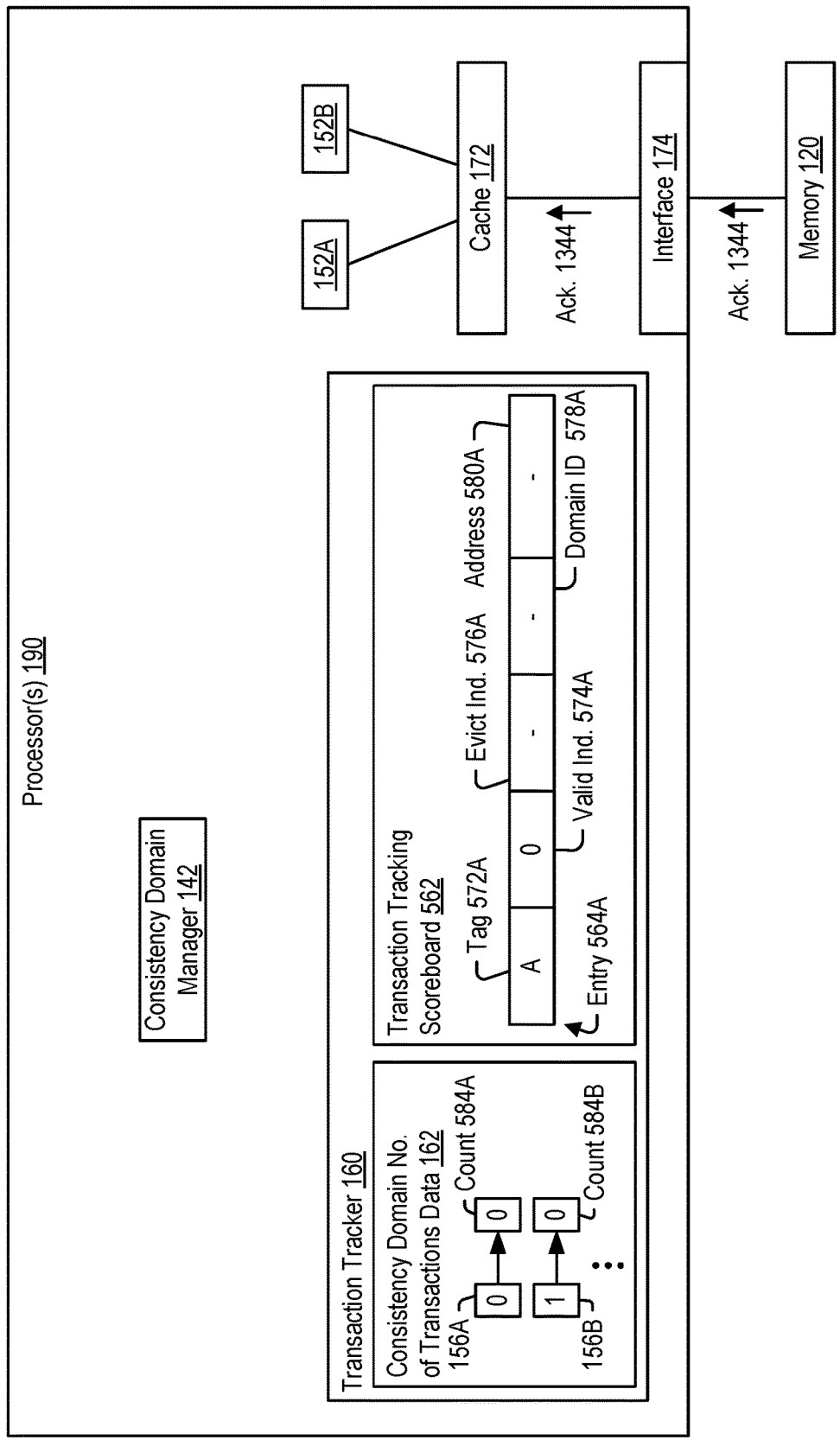
FIG. 13 is a diagram of an illustrative aspect of the system of FIG. 1, in accordance with some examples of the present disclosure.

In FIG. 12, the portion 460 of the cache 172 includes the data 446 of the software thread 152A that is updated in the cache 172 (e.g., as indicated by a dirty bit) and is associated with the address 444, as described with reference to FIG. 4C. The software thread 152B initiates a cache operation 1246 (e.g., a clean cache line operation or a clean and invalidate cache line operation) indicating an opcode 1242 and the address 444. For example, the opcode 1242 includes an identifier of the cache operation 1246. The cache operation 1246 is associated with the consistency domain identifier 156B assigned to the software thread 152B (e.g., as indicated by the domain identifier data 150).

The consistency domain manager 142 detects a cache hit in response to determining that the portion 460 of the cache 172 includes the data 446 associated with the address 444 indicated by the cache operation 1246. The consistency domain manager 142, in response to detecting the cache hit, initiates an eviction of the data 446 and updates the cache 172 to indicate that the portion 460 of the cache 172 is available (e.g., includes invalid data).

Initiating the eviction of the data 446 associated with the address 444 includes performing one or more operations described with reference to FIG. 9. For example, the consistency domain manager 142 updates an available entry 564 (e.g., an invalid entry) of the transaction tracking scoreboard 562 and initiates a store of the data 446 to the address 444 of the memory 120. To illustrate, the consistency domain manager 142 sets the address field 580A of the entry 564A to indicate the address 444 associated with the portion 460. The consistency domain manager 142 sets the eviction indicator field 576A to a second value (e.g., 1) to indicate a pending eviction. The consistency domain manager 142 sets the domain identifier field 578A of the entry 564A to indicate the consistency domain identifier 156A (e.g., 0) assigned to the software thread 152A that is associated with the portion 460.

In some implementations, initiating the eviction of the data 446 includes setting the domain identifier field 578A to also indicate the consistency domain identifier 156B (e.g., 1) assigned to the software thread 152B associated with the cache operation 1246 (illustrated as the domain identifier field 578A including a 0 value representing the consistency domain identifier 156A assigned to the software thread 152A and also including a 1 value representing the consistency domain identifier 156B assigned to the software thread 152B).

In some aspects, a pending eviction due to a cache hit operation corresponds to a pending store operation associated with the consistency domain identifier 156A and with the consistency domain identifier 156B. For example, in some implementations, the consistency domain manager 142 updates (e.g., increments by 1) the count 584A corresponding to the consistency domain identifier 156A and the count 584B corresponding to the consistency domain identifier 156B. The consistency domain manager 142 sets the valid indicator field 574A to a second value (e.g., 1) to indicate that the entry 564A corresponds to a valid entry. The consistency domain manager 142 initiates a store of the data 446 by sending the data 446 via the interface 174 to be written to the address 444 of the memory 120.

In FIG. 13, the memory 120 issues an acknowledgement (ack.) 1344 indicating that storage of data to the address 444 is complete. The consistency domain manager 142, in response to receiving the acknowledgement 1344, determining that the entry 564A is valid (e.g., as indicated by the valid indicator field 574A), and determining that the entry 564A is associated with the address 444 (e.g., as indicated by the address field 580A), updates the valid indicator field 574A to a first value (e.g., 0) to indicate that the entry 564A is invalid and that the pending eviction is completed.

In some implementations, the consistency domain manager 142, in response to receiving the acknowledgement 1344 and prior to setting the valid indicator field 574A to the first value (e.g., 0), updates (e.g., decrements by 1) the count 584A and the count 584B corresponding to the consistency domain identifier 156A and the consistency domain identifier 156B, respectively, that are associated with the address 444 (e.g., as indicated by the domain identifier field 578A).

Operations that may be performed in the event of a cache operation miss are described with reference to a system 1400 of FIG. 14 and a system 1500 of FIG. 15. Each of the system 1400 and the system 1500 is operable to manage memory transactions and may include one or more components that are included in the system 100 of FIG. 1. In particular, FIG. 14 illustrates an example of initiation of a cache operation that corresponds to a miss in the cache 172, and FIG. 15 illustrates an example of completing the cache operation.

Figure 14:
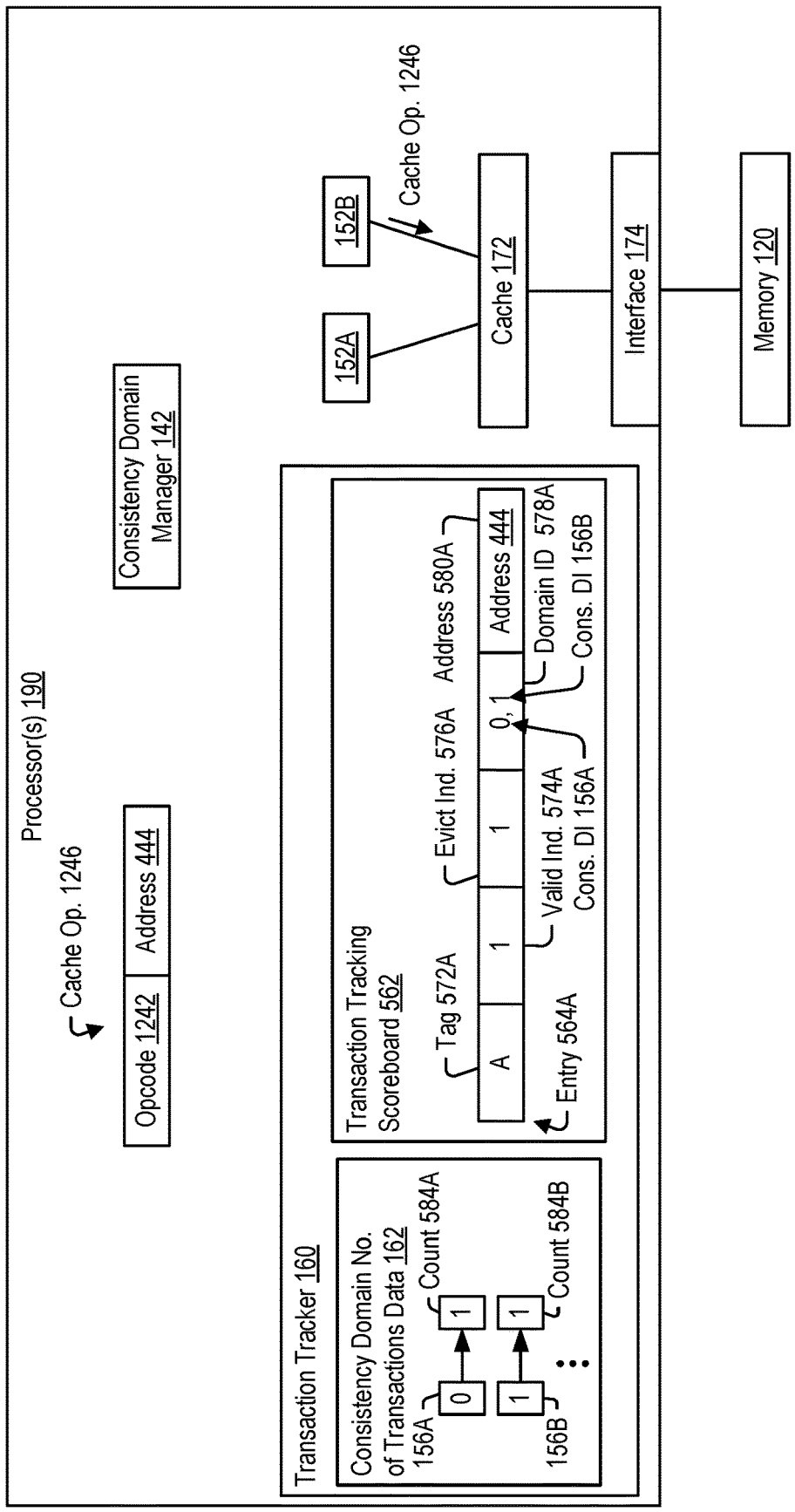
FIG. 14 is a diagram of an illustrative aspect of the system of FIG. 1, in accordance with some examples of the present disclosure.
Figure 15:
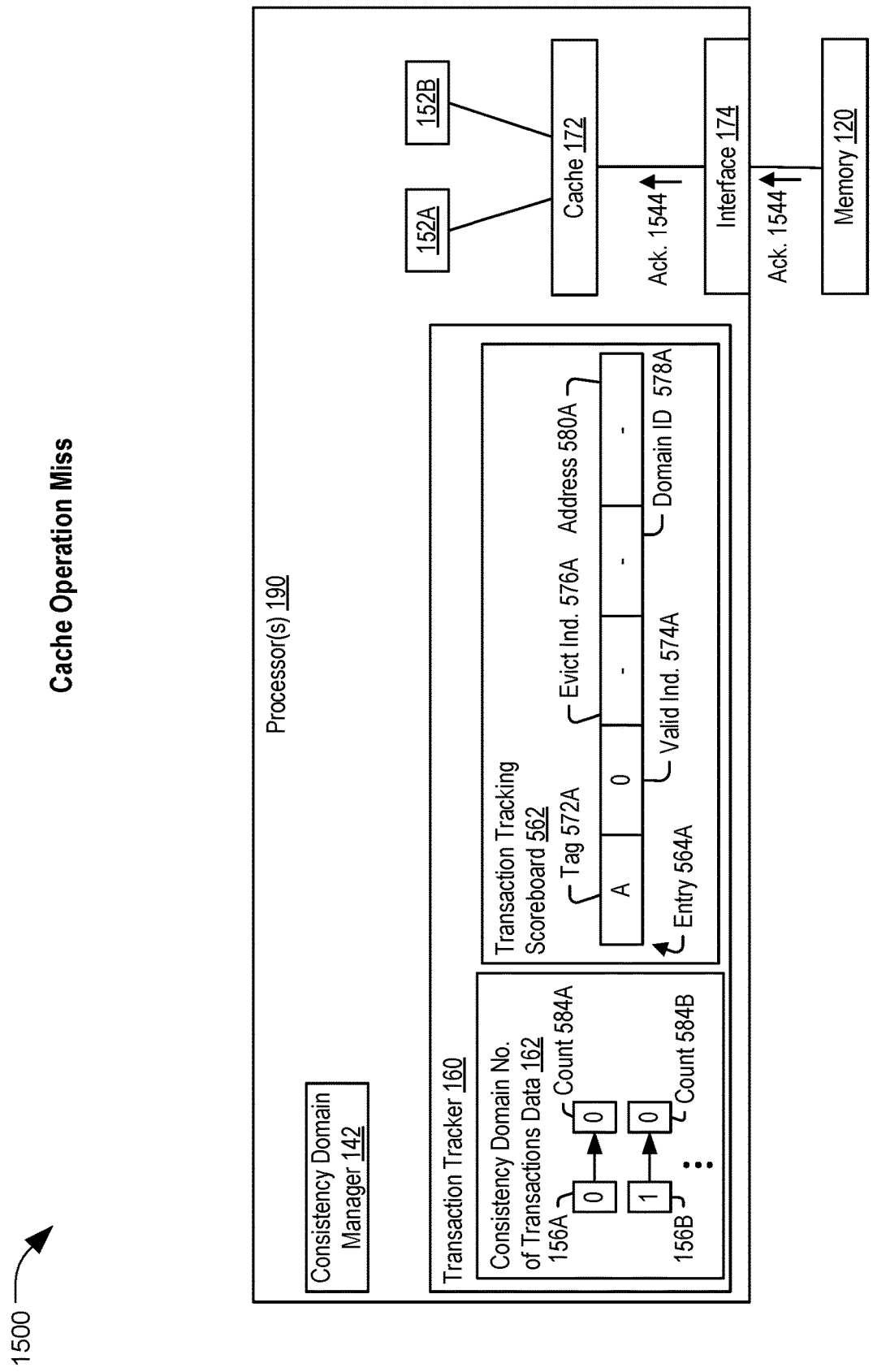
FIG. 15 is a diagram of an illustrative aspect of the system of FIG. 1, in accordance with some examples of the present disclosure.

In FIG. 14, the entry 564A of the transaction tracking scoreboard 562 indicates a pending eviction associated with the address 444. In a particular aspect, the pending eviction corresponds to a capacity eviction, as described with reference to FIG. 9. In another aspect, the pending eviction corresponds to a cache operation hit, as described with reference to FIG. 12.

The software thread 152B initiates the cache operation 1246 (e.g., a clean cache line operation or a clean and invalidate cache line operation) indicating the opcode 1242 and the address 444. The cache operation 1246 is associated with the consistency domain identifier 156B assigned to the software thread 152B (e.g., as indicated by the domain identifier data 150).

The consistency domain manager 142 detects a cache miss in response to determining that no valid data associated with the address 444 is stored in the cache 172. The consistency domain manager 142, in response to detecting the cache miss, assigns the consistency domain identifier 156B associated with the cache operation 1246 to any pending evictions associated with the address 444. For example, the consistency domain manager 142, in response to determining that the entry 564A is valid (e.g., as indicated by the valid indicator field 574A) and corresponds to a pending eviction (e.g., as indicated by the eviction indicator field 576A) associated with the address 444 (e.g., as indicated by the address field 580A), updates the domain identifier field 578A of the entry 564A to also indicate the consistency domain identifier 156B.

In a particular aspect, the pending eviction indicated by the entry 564A corresponds to a pending store operation associated with the consistency domain identifier 156B in addition to any other consistency domain identifiers indicated by the domain identifier field 578A. For example, in some implementations, the consistency domain manager 142 updates (e.g., increments by 1) the count 584A corresponding to the consistency domain identifier 156A and another count (e.g., the count 584B) corresponding to another consistency domain identifier (e.g., the consistency domain identifier 156B) indicated by the domain identifier field 578A.

In FIG. 15, the memory 120 issues an acknowledgement (ack.) 1544 indicating that storage of data to the address 444 is complete. The consistency domain manager 142, in response to receiving the acknowledgement 1544, determining that the entry 564A is valid (e.g., as indicated by the valid indicator field 574A), and determining that the entry 564A is associated with the address 444 (e.g., as indicated by the address field 580A), updates the valid indicator field 574A to a first value (e.g., 0) to indicate that the entry 564A is invalid and that the pending eviction is completed.

In some implementations, the consistency domain manager 142, in response to receiving the acknowledgement 1544 and prior to setting the valid indicator field 574A to the first value (e.g., 0), updates (e.g., decrements by 1) the count 584A corresponding to the consistency domain identifier 156A that is associated with the address 444 (e.g., as indicated by the domain identifier field 578A). In addition, the consistency domain manager 142, in response to receiving the acknowledgement 1544 and prior to setting the valid indicator field 574A to the first value (e.g., 0), also updates (e.g., decrements by 1) the count (e.g., the count 584B) corresponding to any other consistency domain identifier (e.g., the consistency domain identifier 156B) that is associated with the address 444 (e.g., as indicated by the domain identifier field 578A).

Operations that may be performed that account for capacity domains are described with reference to a system 1600 of FIG. 16 and a system 1700 of FIG. 17. Each of the system 1600 and the system 1700 is operable to manage memory transactions and may include one or more components that are included in the system 100 of FIG. 1. In particular, FIG. 16 illustrates an example of updating a count of pending memory access instructions corresponding to a capacity domain identifier responsive to a read instruction, and FIG. 17 illustrates an example of updating a count of pending memory access instructions corresponding to a capacity domain identifier responsive to a write instruction.

Figure 16:
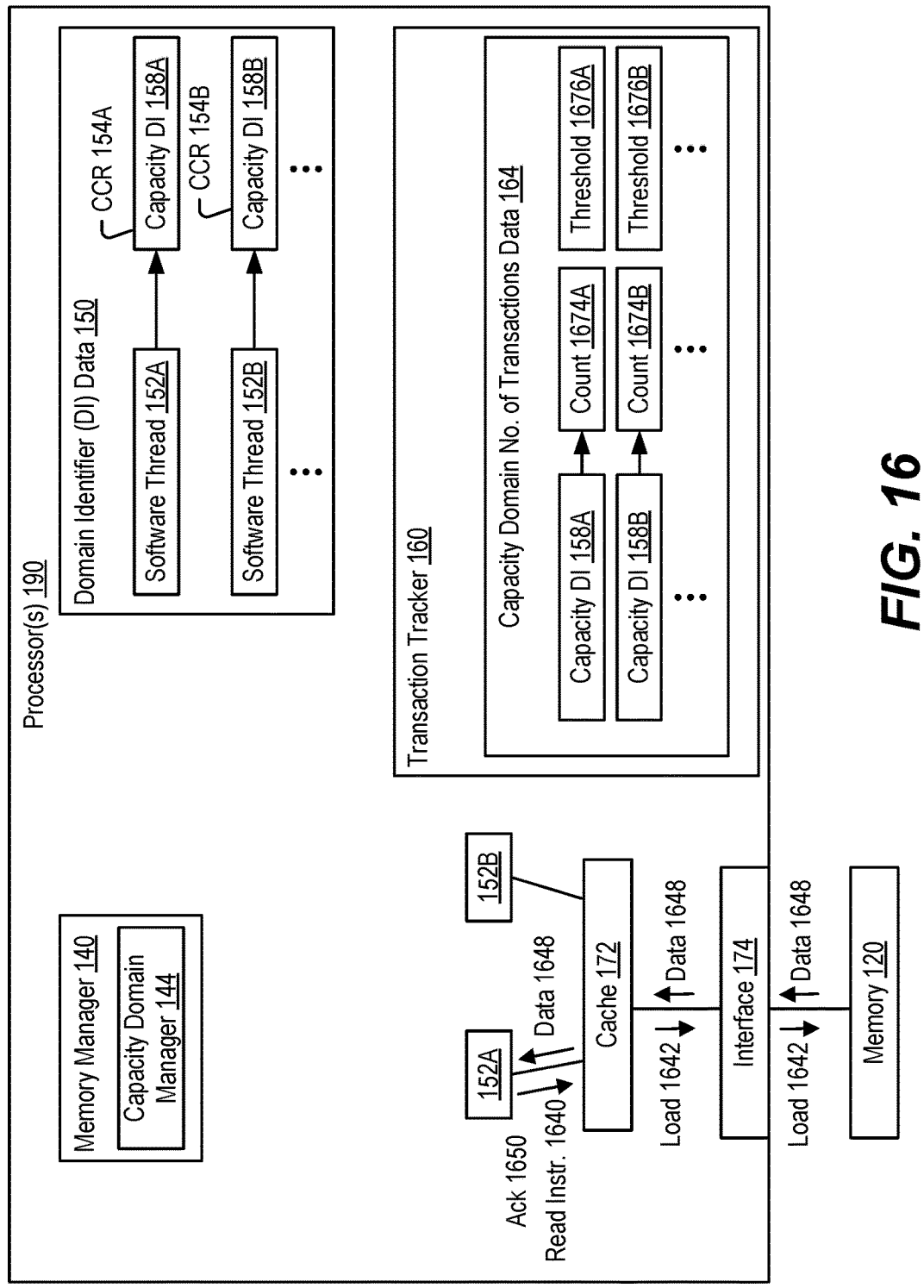
FIG. 16 is a diagram of an illustrative aspect of the system of FIG. 1, in accordance with some examples of the present disclosure.

In FIG. 16, the transaction tracker 160 includes the capacity domain number of transactions data 164 that indicates capacity thresholds 1676 associated with the capacity domain identifiers 158. For example, the capacity domain number of transactions data 164 indicates that the capacity domain identifier 158A is associated with a capacity threshold 1676A, the capacity domain identifier 158B is associated with a capacity threshold 1676B, and so on. The capacity threshold 1676B may be the same as or distinct from the capacity threshold 1676A. In a particular aspect, the capacity thresholds 1676 are based on a configuration setting, user input, default data, or a combination thereof.

The capacity domain manager 144 is configured to use the capacity domain number of transactions data 164 to track counts 1674 of pending memory access instructions associated with the capacity domain identifiers 158. The software thread 152A issues a read instruction 1640. The capacity domain manager 144 selectively enables the read instruction 1640 based on the counts 1674. In some aspects, the capacity domain manager 144 determines whether a capacity limit associated with any capacity domain identifier that matches the capacity domain identifier 158A (that is assigned to the software thread 152A) has been reached. For example, the capacity domain identifier 158A is a match for itself and the capacity domain manager 144, in response to determining that the count 1674A associated with the capacity domain identifier 158A is greater than or equal to the capacity threshold 1676A associated with the capacity domain identifier 158A, determines that a capacity limit associated with the capacity domain identifier 158A has been reached. In some examples, another capacity domain identifier (e.g., the capacity domain identifier 158B) that is not the same as the capacity domain identifier 158A can also match the capacity domain identifier 158A, as described with reference to FIG. 3. The capacity domain manager 144, in response to determining that the count 1674B associated with the capacity domain identifier 158B is greater than or equal to the capacity threshold 1676B associated with the capacity domain identifier 158B, determines that a capacity limit associated with the capacity domain identifier 158B has been reached.

The capacity domain manager 144 disables the read instruction 1640 in response to determining that a capacity limit has been reached for at least one capacity domain identifier that matches the capacity domain identifier 158A. In some implementations, disabling the read instruction 1640 includes discarding the read instruction 1640. In other implementations, disabling the read instruction 1640 includes adding the read instruction 1640 to an instruction buffer to be performed when capacity is available (e.g., capacity limit has not been reached) for all capacity domain identifiers that match the capacity domain identifier 158A.

The capacity domain manager 144, in response to determining that capacity is available for all capacity domain identifiers that match the capacity domain identifier 158A, enables the read instruction 1640 and updates (e.g., increments by 1) the count 1674A. In some aspects, data associated with an address indicated by the read instruction 1640 is available in the cache 172. In these aspects, enabling the read instruction 1640 includes providing the data from the cache 172 to the software thread 152A.

In some aspects, data associated with the address indicated by the read instruction 1640 is not available in the cache 172. In these aspects, enabling the read instruction 1640 includes initiating a memory access associated with the read instruction 1640. For example, the capacity domain manager 144 initiates a load 1642 of the data from the memory 120. The capacity domain manager 144 receives data 1648 (e.g., stored at the address indicated by the read instruction 1640) via the interface 174 from the memory 120. The capacity domain manager 144 stores the data 1648 in the cache 172 and provides the data 1648 from the cache 172 to the software thread 152A.

When the software thread 152A is done reading the data 1648 from the cache 172, the software thread 152A issues an acknowledgement 1650 indicating that the memory access associated with the read instruction 1640 is complete. The capacity domain manager 144, in response to receiving the acknowledgement 1650, updates (e.g., decrements by 1) the count 1674A.

Figure 17:
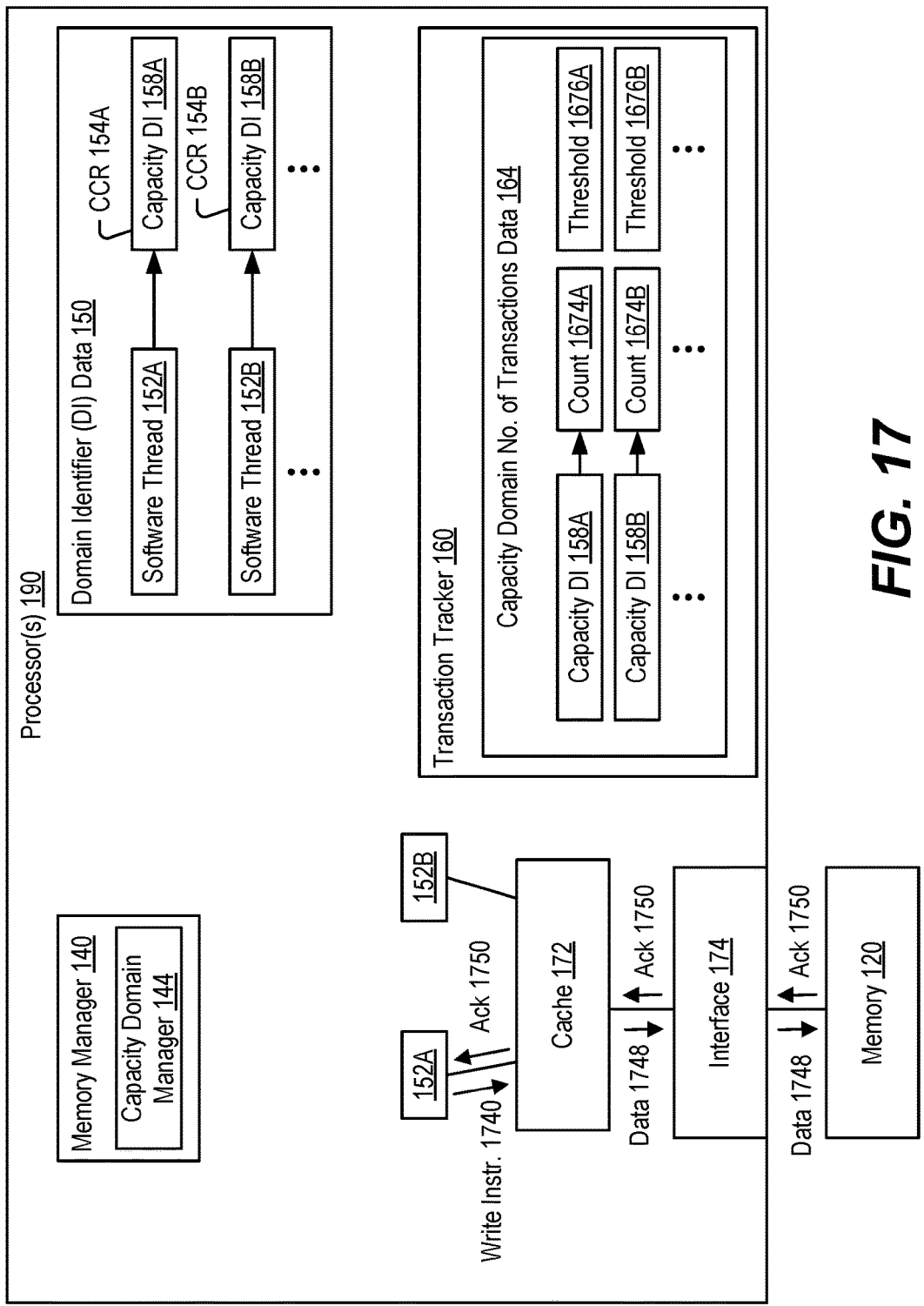
FIG. 17 is a diagram of an illustrative aspect of the system of FIG. 1, in accordance with some examples of the present disclosure.

In FIG. 17, the software thread 152A issues a write instruction 1740. The capacity domain manager 144 selectively enables the write instruction 1740 based on the counts 1674. The capacity domain manager 144 determines whether a capacity limit associated with any capacity domain identifier that matches the capacity domain identifier 158A (that is assigned to the software thread 152A) has been reached, as described with reference to FIG. 16.

The capacity domain manager 144 disables the write instruction 1740 in response to determining that a capacity limit has been reached for at least one capacity domain identifier that matches the capacity domain identifier 158A. In some implementations, disabling the write instruction 1740 includes discarding the write instruction 1740. In other implementations, disabling the write instruction 1740 includes adding the write instruction 1740 to an instruction buffer to be performed when capacity is available (e.g., capacity limit has not been reached) for all capacity domain identifiers that match the capacity domain identifier 158A.

The capacity domain manager 144, in response to determining that capacity is available for all capacity domain identifiers that match the capacity domain identifier 158A, enables the write instruction 1740 and updates (e.g., increments by 1) the count 1674A. Enabling the write instruction 1740 includes initiating a memory access associated with the write instruction 1740. In some aspects, initiating the memory access includes initiating a store operation of data 1748 indicated by the write instruction 1740 to an address indicated by the write instruction 1740. To illustrate, the capacity domain manager 144 provides the data 1748 via the interface 174 to the memory 120. The memory 120 provides an acknowledgement 1750 indicating that the memory access (e.g., the store operation) associated with the write instruction 1740 is complete.

In some aspects, initiating the memory access includes storing the data 1748 in the cache 172. In these aspects, the software thread 152A may provide the acknowledgement 1750 indicating that the memory access (e.g., the store to the cache 172) associated with the write instruction 1740 is complete.

The capacity domain manager 144, in response to receiving the acknowledgement 1750, updates (e.g., decrements by 1) the count 1674A. In some implementations, the capacity domain manager 144, subsequent to decrementing the count 1674A, determines whether a memory access instruction stored in an instruction buffer is a candidate for enabling. For example, the capacity domain manager 144, in response to determining that capacity is available for all capacity domain identifiers that match a capacity domain identifier associated with the memory access instruction, enables the memory access instruction, removes the memory access instruction from the instruction buffer, and updates (e.g., increments) a count associated with the capacity domain identifier.

Figure 18:
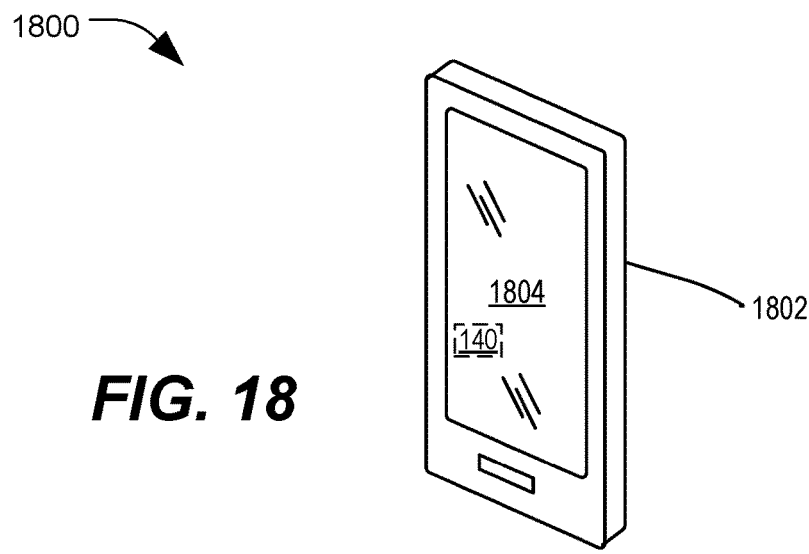
FIG. 18 is a diagram of a mobile device operable to manage memory transactions, in accordance with some examples of the present disclosure.

The memory manager 140 is illustrated as not including the consistency domain manager 142 in addition to the capacity domain manager 144 in FIGS. 17-18 for ease of description. In some implementations, the memory manager 140 can include the consistency domain manager 142 and the capacity domain manager 144. For example, the consistency domain manager 142 updates the transaction tracking scoreboard 562 concurrently with initiating the write of the data 1748 to the memory 120 and updates the transaction tracking scoreboard 562 in response to receiving the acknowledgement 1750, as described with reference to FIGS. 5-8.

It should be noted that various functions performed by the one or more processors 190 are described as being performed by certain components or modules. However, this division of components and modules is for illustration only. In an alternate aspect, a function described herein as performed by a particular component or module is divided amongst multiple components or modules. Moreover, in an alternate aspect, two or more components or modules of the one or more processors 190 are integrated into a single component or module. In a particular aspect, one or more functions described herein as performed by the device 102 are divided amongst multiple devices (e.g., the device 102, a central server, a distributed system, or any combination thereof).

FIG. 18 depicts an implementation 1800 in which the device 102 includes a mobile device 1802, such as a phone or tablet, as illustrative, non-limiting examples. The mobile device 1802 includes a display screen 1804. Components of the one or more processors 190, including the memory manager 140, are integrated in the mobile device 1802 and are illustrated using dashed lines to indicate internal components that are not generally visible to a user of the mobile device 1802. In a particular example, the memory manager 140 operates to access a memory of the mobile device 1802 to perform one or more operations at the mobile device 1802, such as to launch a graphical user interface or otherwise display other information at the display screen 1804 (e.g., via an integrated "smart assistant" application).

In some aspects, the memory manager 140 enables memory access transactions for a consistency domain identifier to remain unaffected by synchronization operations of a non-matching consistency domain identifier. For example, memory accesses of a first application (e.g., video playback) associated with a first consistency domain identifier are not blocked by a synchronization operation of a second application (e.g., a social networking application) associated with a second consistency domain identifier that does not match the first consistency domain identifier. In some aspects, the memory manager 140 segregates capacity limits based on capacity domain identifiers. For example, memory accesses of the second application (e.g., the social networking application) are not blocked by too many memory accesses of the first application (e.g., video playback).

Figure 19:
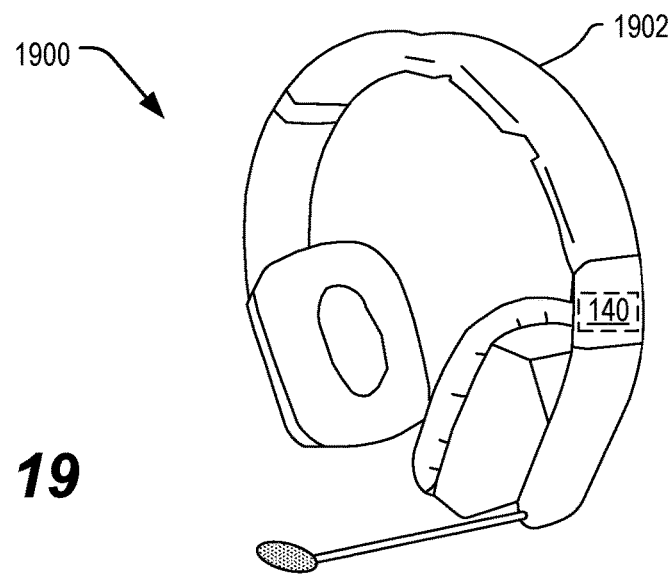
FIG. 19 is a diagram of a headset operable to manage memory transactions, in accordance with some examples of the present disclosure.

FIG. 19 depicts an implementation 1900 in which the device 102 includes a headset device 1902. Components of the one or more processors 190, including the memory manager 140, are integrated in the headset device 1902. In a particular example, the memory manager 140 operates to access a memory of the headset device 1902 to perform one or more operations at the headset device 1902.

Figure 20:
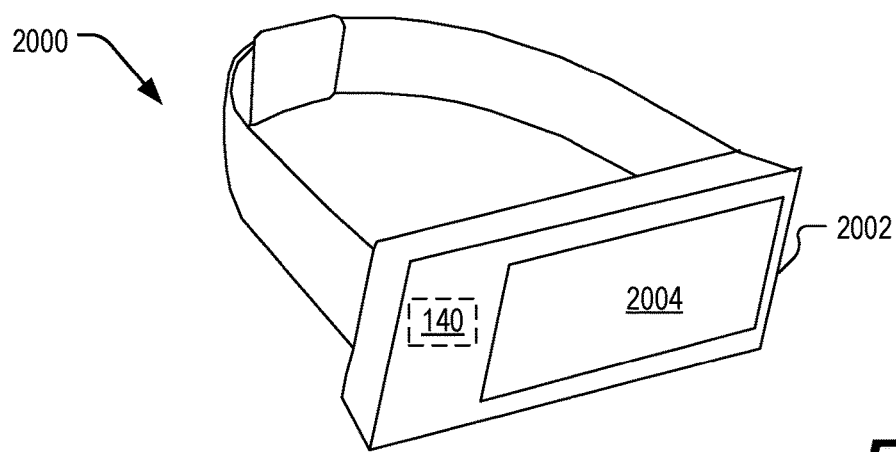
FIG. 20 is a diagram of a wearable electronic device operable to manage memory transactions, in accordance with some examples of the present disclosure.

FIG. 20 depicts an implementation 2000 in which the device 102 includes a wearable electronic device 2002, illustrated as a "smart watch." The memory manager 140 is integrated into the wearable electronic device 2002. In a particular example, the memory manager 140 operates to access a memory of the wearable electronic device 2002 to perform one or more operations at the wearable electronic device 2002, such as to launch a graphical user interface or otherwise display other information associated with user's speech at a display screen 2004 of the wearable electronic device 2002. To illustrate, the wearable electronic device 2002 may include a display screen that is configured to display a notification based on user speech detected by the wearable electronic device 2002. In a particular example, the wearable electronic device 2002 includes a haptic device that provides a haptic notification (e.g., vibrates) in response to detection of user voice activity. For example, the haptic notification can cause a user to look at the wearable electronic device 2002 to see a displayed notification indicating detection of a keyword spoken by the user.

Figure 21:
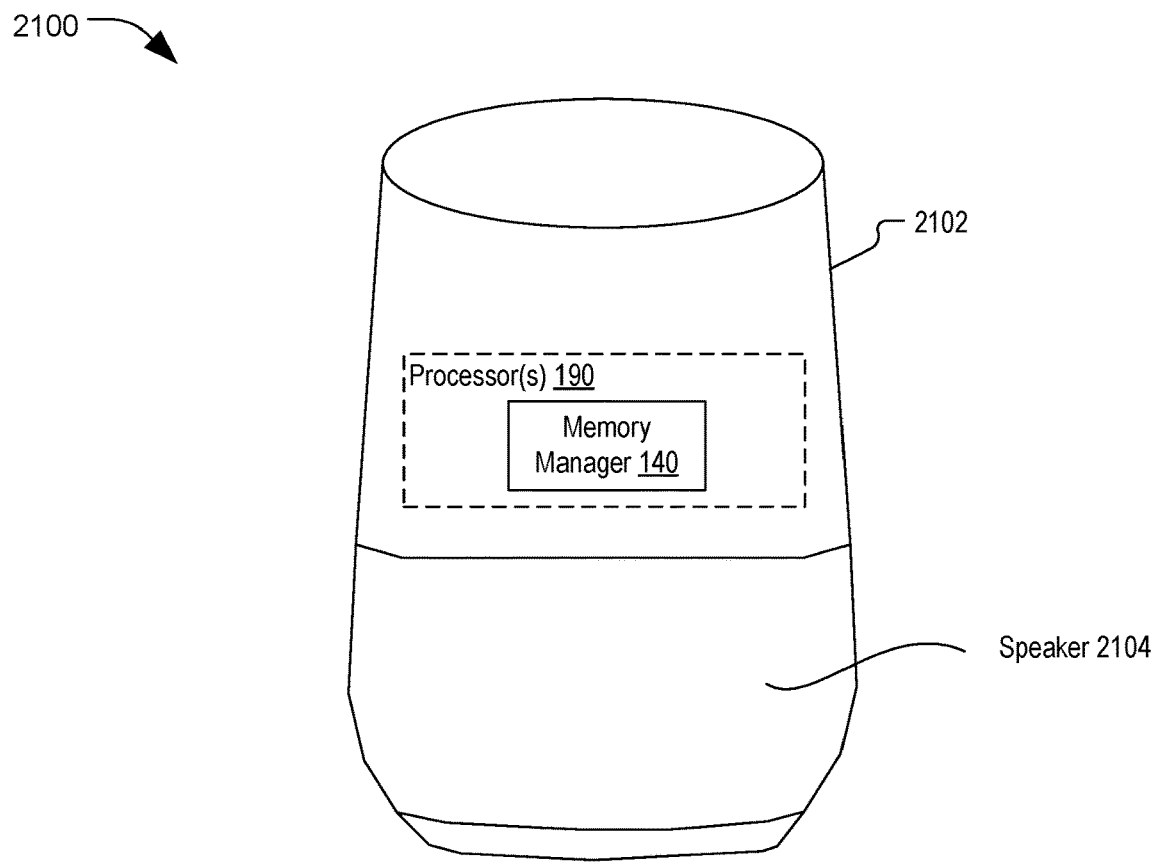
FIG. 21 is a diagram of a voice-controlled speaker system operable to manage memory transactions, in accordance with some examples of the present disclosure.

FIG. 21 is an implementation 2100 in which the device 102 includes a wireless speaker and voice activated device 2102. The wireless speaker and voice activated device 2102 can have wireless network connectivity and is configured to execute an assistant operation. The one or more processors 190 including the memory manager 140 are included in the wireless speaker and voice activated device 2102. The wireless speaker and voice activated device 2102 also includes a speaker 2104. During operation, the memory manager 140 operates to access a memory of the wireless speaker and voice activated device 2102 to execute assistant operations, such as via execution of a voice activation system (e.g., an integrated assistant application). The assistant operations can include adjusting a temperature, playing music, turning on lights, etc. For example, the assistant operations are performed responsive to receiving a command after a keyword or key phrase (e.g., "hello assistant").

Figure 22:
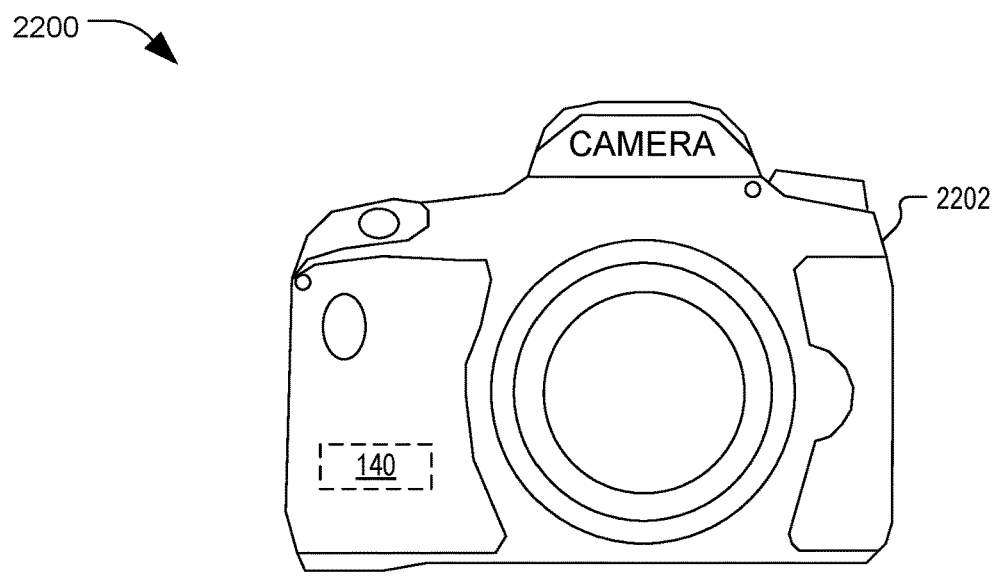
FIG. 22 is a diagram of a camera operable to manage memory transactions, in accordance with some examples of the present disclosure.

FIG. 22 depicts an implementation 2200 in which the device 102 includes a portable electronic device that corresponds to a camera device 2202. The memory manager 140 is included in the camera device 2202. During operation, the memory manager 140 accesses a memory of the camera device 2202 to execute operations responsive to spoken user commands, such as to adjust image or video capture settings, image or video playback settings, or image or video capture instructions, as illustrative examples.

Figure 23:
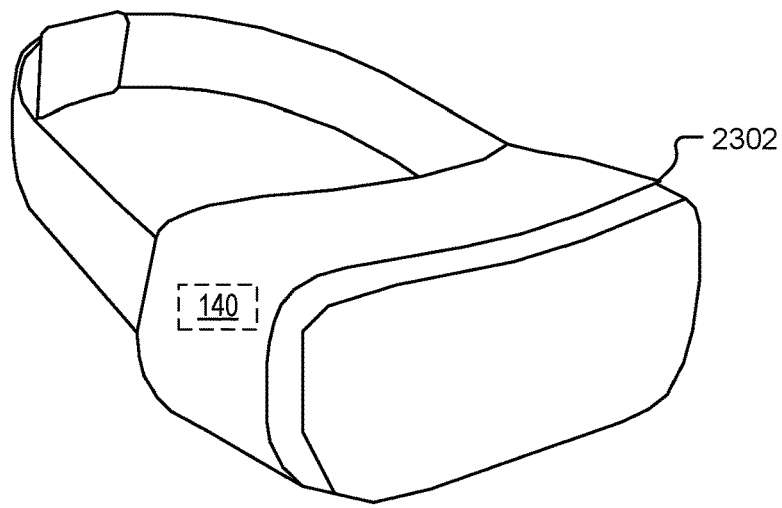
FIG. 23 is a diagram of a headset, such as a virtual reality, mixed reality, or augmented reality headset, operable to manage memory transactions, in accordance with some examples of the present disclosure.

FIG. 23 depicts an implementation 2300 in which the device 102 includes a portable electronic device that corresponds to a virtual reality, mixed reality, or augmented reality headset 2302. The memory manager 140 is integrated into the headset 2302. The memory manager 140 operates to access a memory of the headset 2302 to execute operations at the headset 2302. In a particular aspect, user voice activity detection can be performed based on audio signals received from one or more microphones of the headset 2302. A visual interface device is positioned in front of the user's eyes to enable display of augmented reality, mixed reality, or virtual reality images or scenes to the user while the headset 2302 is worn. In a particular example, the visual interface device is configured to display a notification indicating user speech detected in the audio signals.

Figure 24:
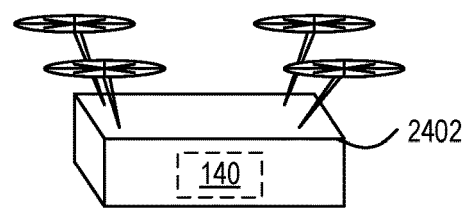
FIG. 24 is a diagram of a first example of a vehicle operable to manage memory transactions, in accordance with some examples of the present disclosure.

FIG. 24 depicts an implementation 2400 in which the device 102 corresponds to, or is integrated within, a vehicle 2402, illustrated as a manned or unmanned aerial device (e.g., a package delivery drone). The memory manager 140 is integrated into the vehicle 2402. The memory manager 140 operates to access a memory of the vehicle 2402 to execute operations at the vehicle 2402. User voice activity detection can be performed based on audio signals received from the one or more microphones of the vehicle 2402, such as for delivery instructions from an authorized user of the vehicle 2402.

Figure 25:
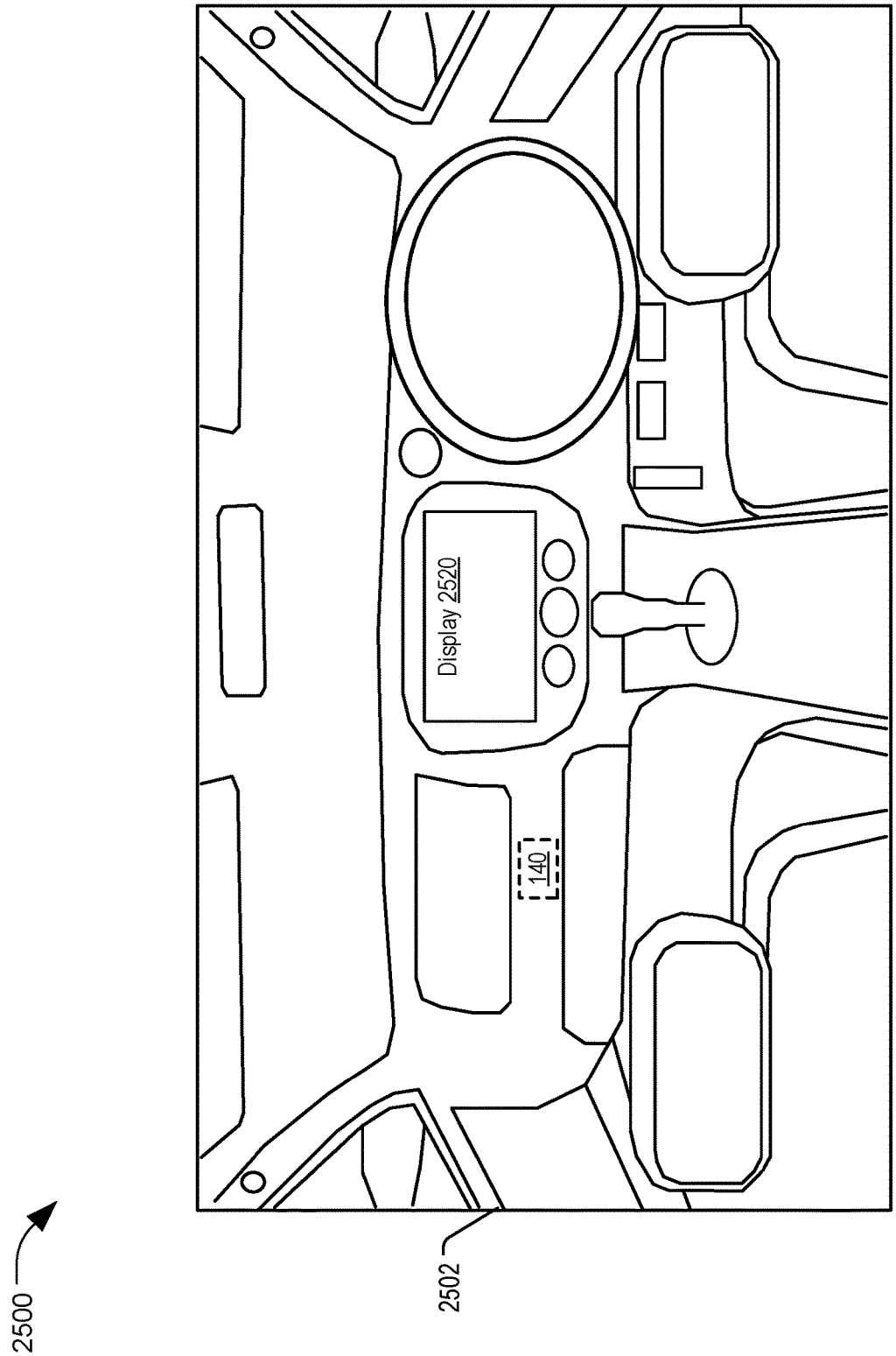
FIG. 25 is a diagram of a second example of a vehicle operable to manage memory transactions, in accordance with some examples of the present disclosure.

FIG. 25 depicts another implementation 2500 in which the device 102 corresponds to, or is integrated within, a vehicle 2502, illustrated as a car. The vehicle 2502 includes the one or more processors 190 including the memory manager 140. The memory manager 140 operates to access a memory of the vehicle 2502 to execute operations at the vehicle 2502. User voice activity detection can be performed based on audio signals received from one or more microphones of the vehicle 2502. In some implementations, user voice activity detection can be performed based on an audio signal received from interior microphones, such as for a voice command from an authorized passenger. For example, the user voice activity detection can be used to detect a voice command from an operator of the vehicle 2502. In some implementations, user voice activity detection can be performed based on an audio signal received from external microphones, such as an authorized user of the vehicle. In a particular implementation, in response to receiving a verbal command identified as user speech, a voice activation system initiates one or more operations of the vehicle 2502 based on one or more keywords (e.g., "unlock," "start engine," "play music," "display weather forecast," or another voice command) detected in an input signal, such as by providing feedback or information via a display 2520 or one or more speakers.

Figure 26:
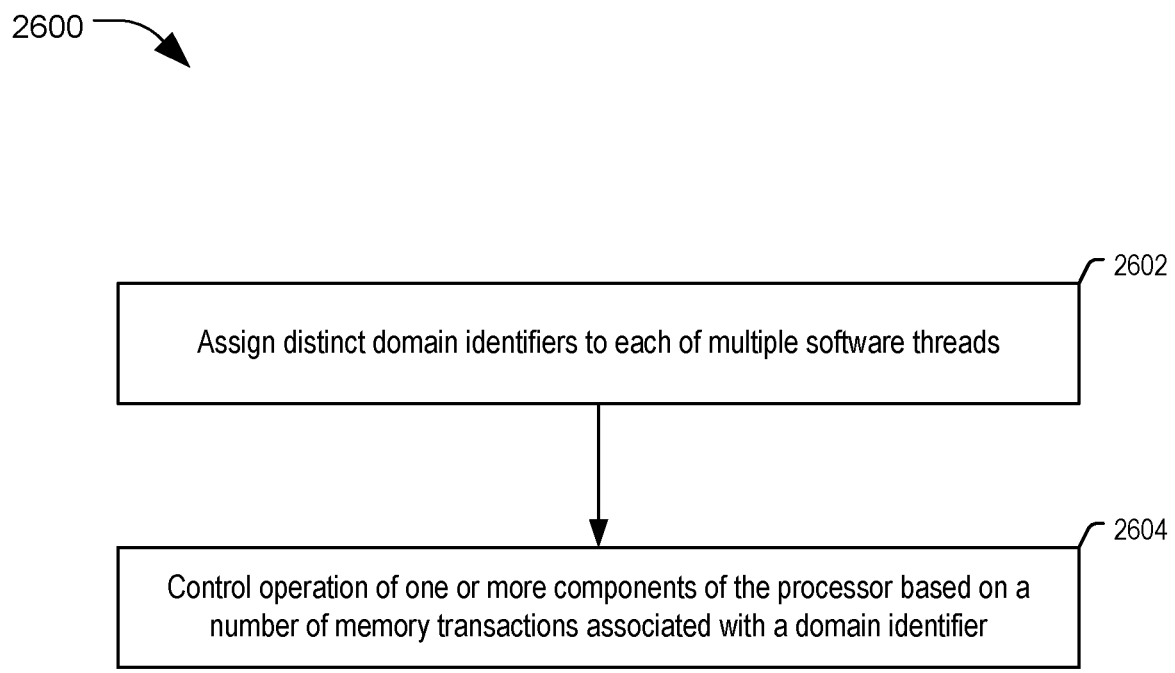
FIG. 26 is diagram of a particular implementation of a method of managing memory transactions that may be performed by the device of FIG. 1, in accordance with some examples of the present disclosure.

Referring to FIG. 26, a particular implementation of a method 2600 of memory transaction management is shown. In a particular aspect, one or more operations of the method 2600 are performed by at least one of the memory manager 140, the one or more processors 190, the device 102, the system 100 of FIG. 1, or a combination thereof. In a particular aspect, the method 2600 is computer-implemented.

The method 2600 includes assigning distinct domain identifiers to each of multiple software threads, at 2602. For example, the consistency domain manager 142 assigns the consistency domain identifiers 156 to each of the multiple software threads 152, as described with reference to FIG. 1.

As another example, the capacity domain manager 144 assigns capacity domain identifiers 158 to each of the multiple software threads 152, as described with reference to FIG. 1.

The method 2600 also includes controlling operation of one or more components of the processor based on a number of memory transactions associated with a domain identifier, at 2604. For example, the consistency domain manager 142 controls operations of the one or more components 170 of the one or more processors 190 based on the consistency domain number of transactions data 162, as described with reference to FIG. 1. As another example, the capacity domain manager 144 controls operations of the one or more components 170 of the one or more processors 190 based on the capacity domain number of transactions data 164, as described with reference to FIG. 1.

In implementations in which the domain identifiers correspond to capacity domain identifiers, the method 2600 can limit a count of pending memory accesses that can be associated with a capacity domain identifier to enable resources to be available for memory accesses associated with other capacity domain identifiers. To illustrate, the software thread 152A is associated with a capacity domain identifier 158A, as described with reference to FIG. 16. Controlling the operations of the one or more components 170 includes refraining from initiating a memory access of the software thread 152A in response to determining that a count of pending memory accesses associated with any capacity domain identifier (e.g., a capacity domain identifier 158B) that matches the capacity domain identifier 158A is equal to a corresponding threshold count, as described with reference to FIGS. 16-17. Memory accesses associated with other capacity domain identifiers that do not match the capacity domain identifier 158A are not affected by the count of pending memory accesses associated with the capacity domain identifier 158A.

Alternatively, or in addition, in implementations in which the domain identifiers correspond to consistency domain identifiers, the method 2600 can ensure that a synchronization instruction associated with a particular consistency domain identifier does not affect (e.g., delay) memory access instructions associated with other consistency domain identifiers that do not match the particular consistency domain identifier. To illustrate, a synchronization instruction 644 is associated with a consistency domain identifier 156A, as described with reference to FIG. 6. Controlling the operations of the one or more components 170 includes enabling pending memory access instructions associated with any consistency domain identifier (e.g., a consistency domain identifier 156B) that matches the consistency domain identifier 156A to be performed (e.g., count of pending memory access instructions=0) prior to performing any subsequent memory access instructions associated with the matching consistency domain identifier (e.g., the consistency domain identifier 156B), as described with reference to FIGS. 6-8. The synchronization instruction 644 does not affect (e.g., delay) memory access instructions associated with other consistency domain identifiers that do not match the consistency domain identifier 156A.

The method 2600 of FIG. 26 may be implemented by a field-programmable gate array (FPGA) device, an application-specific integrated circuit (ASIC), a processing unit such as a central processing unit (CPU), a DSP, a GPU, a controller, another hardware device, firmware device, or any combination thereof. As an example, the method 2600 of FIG. 26 may be performed by a processor that executes instructions, such as described with reference to FIG. 27.

Figure 27:
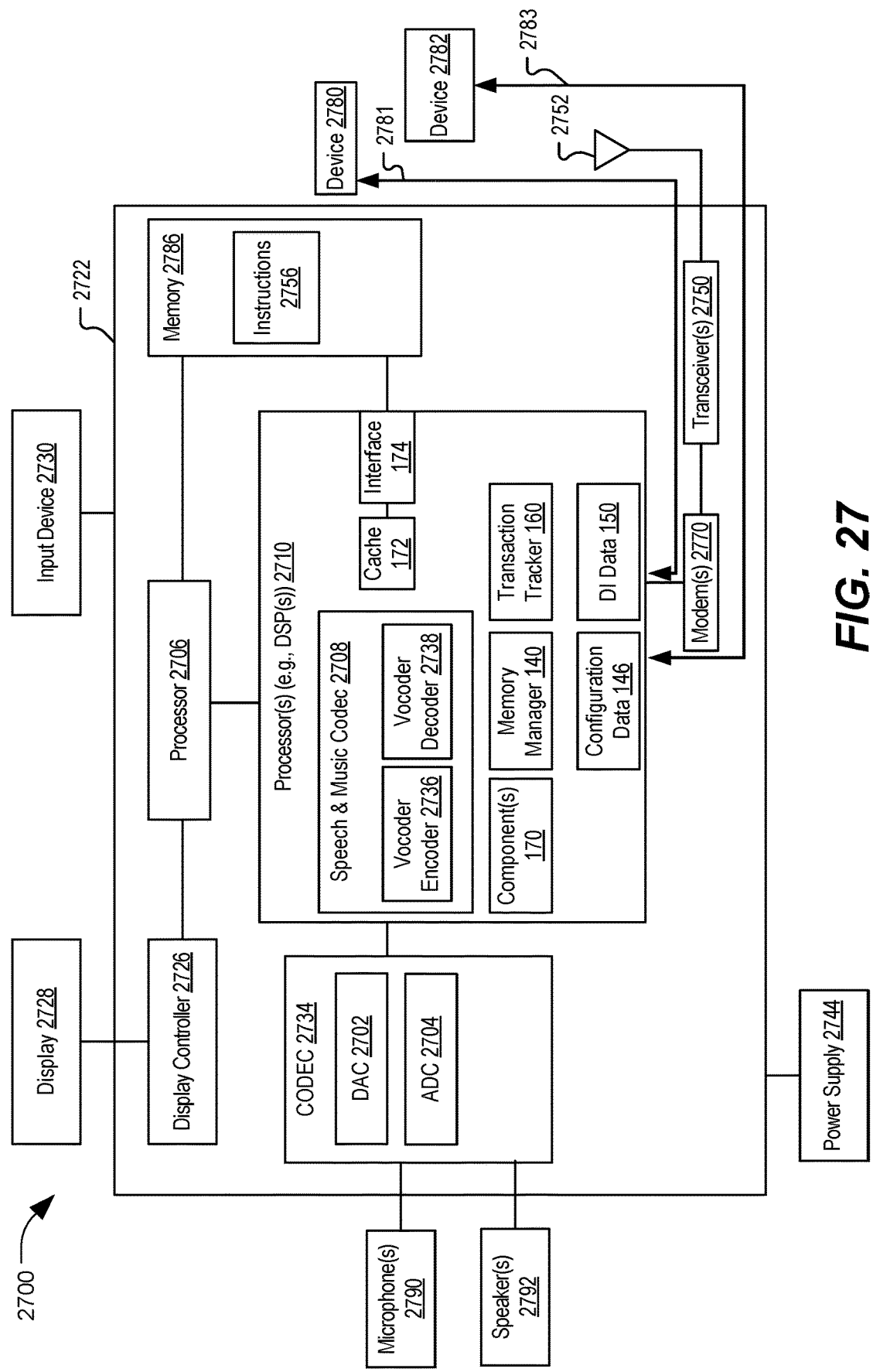
FIG. 27 is a block diagram of a particular illustrative example of a device that is operable to manage memory transactions, in accordance with some examples of the present disclosure.

Referring to FIG. 27, a block diagram of a particular illustrative implementation of a device 2700 is depicted. In various implementations, the device 2700 may have more or fewer components than illustrated in FIG. 27. In an illustrative implementation, the device 2700 may correspond to the device 102. In an illustrative implementation, the device 2700 may perform one or more operations described with reference to FIGS. 1-26.

In a particular implementation, the device 2700 includes a processor 2706 (e.g., a CPU). The device 2700 may include one or more additional processors 2710 (e.g., one or more DSPs, one or more GPUs, or a combination thereof). In a particular aspect, the one or more processors 190 of FIG. 1 corresponds to the processor 2706, the processors 2710, or a combination thereof. The processors 2710 may include a speech and music coder-decoder (CODEC) 2708 that includes a voice coder ("vocoder") encoder 2736, a vocoder decoder 2738, or both. The processors 2710 may include the one or more components 170, the memory manager 140, the transaction tracker 160, the configuration data 146, the domain identifier data 150, or a combination thereof.

The device 2700 may include a memory 2786 and a CODEC 2734. In some implementations, the memory 2786 includes the memory 120 of FIG. 1. In other implementations, the memory 120 is distinct from the memory 2786. The memory 2786 may include instructions 2756, that are executable by the one or more additional processors 2710 (or the processor 2706) to implement the functionality described with reference to the memory manager 140. The device 2700 may include one or more modems 2770 coupled, via one or more transceivers 2750, to one or more antennas 2752.

In some aspects, the processors 2710 (or the processor 2706) are configured to communicate via the one or more modems 2770 and the one or more transceivers 2750 with a device 2780, a device 2782, or both. In a particular example, the device 2700 exchanges traffic 2781 (e.g., cellular modem traffic) with the device 2780, exchanges traffic 2783 (e.g., WLAN traffic) with the device 2782, or both. For example, the traffic 2781 is exchanged along a data path via at least one (e.g., a cellular modem) of the one or more modems 2770, at least one of the one or more transceivers 2750, and at least one of the one or more antennas 2752 to the device 2780. Similarly, the traffic 2783 is exchanged along a data path via at least one (e.g., a WLAN modem) of the one or more modems 2770, at least one of the one or more transceivers 2750, and at least one of the one or more antennas 2752 to the device 2782.

In a particular implementation, the consistency domain manager 142 of the memory manager 140 enforces synchronization of the traffic 2781 (e.g., cellular modem traffic) independently of the traffic 2783 (e.g., WLAN traffic). For example, the consistency domain manager 142 ensures that a synchronization operation associated with the cellular modem memory transactions does not block subsequent WLAN memory transactions, and vice versa. In a particular aspect, the capacity domain manager 144 of the memory manager 140 enforces resource utilization of the traffic 2781 (e.g., cellular modem traffic) independently of the traffic 2783 (e.g., WLAN traffic). For example, the capacity domain manager 144 ensures that cellular modem memory transactions are not blocked by WLAN memory transactions, and vice versa.

The device 2700 may include a display 2728 coupled to a display controller 2726. One or more speakers 2792, one or more microphones 2790, or a combination thereof, may be coupled to the CODEC 2734. The CODEC 2734 may include a digital-to-analog converter (DAC) 2702, an analog-to-digital converter (ADC) 2704, or both. In a particular implementation, the CODEC 2734 may receive analog signals from the one or more microphones 2790, convert the analog signals to digital signals using the analog-to-digital converter 2704, and provide the digital signals to the speech and music codec 2708. The speech and music codec 2708 may process the digital signals. In a particular implementation, the speech and music codec 2708 may provide digital signals to the CODEC 2734. The CODEC 2734 may convert the digital signals to analog signals using the digital-to-analog converter 2702 and may provide the analog signals to the one or more speakers 2792.

In a particular implementation, the device 2700 may be included in a system-in-package or system-on-chip device 2722. In a particular implementation, the memory 2786, the processor 2706, the processors 2710, the display controller 2726, the CODEC 2734, and the one or more modems 2770 are included in the system-in-package or system-on-chip device 2722. In a particular implementation, an input device 2730 and a power supply 2744 are coupled to the system-in-package or the system-on-chip device 2722. Moreover, in a particular implementation, as illustrated in FIG. 27, the display 2728, the input device 2730, the one or more speakers 2792, the one or more microphones 2790, the one or more antennas 2752, and the power supply 2744 are external to the system-in-package or the system-on-chip device 2722. In a particular implementation, each of the display 2728, the input device 2730, the one or more speakers 2792, the one or more microphones 2790, the one or more antennas 2752, and the power supply 2744 may be coupled to a component of the system-in-package or the system-on-chip device 2722, such as an interface or a controller.

The device 2700 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for assigning distinct domain identifiers to each of multiple software threads. For example, the means for assigning distinct domain identifiers can correspond to the consistency domain manager 142, the capacity domain manager 144, the memory manager 140, the one or more processors 190, the device 102, the system 100 of FIG. 1, the processor 2706, the one or more processors 2710, the device 2700, one or more other circuits or components configured to assign distinct domain identifiers to each of multiple software threads, or any combination thereof.

The apparatus also includes means for controlling operation of one or more components of a processor based on a number of memory transactions associated with a domain identifier. For example, the means for controlling operation can correspond to the consistency domain manager 142, the capacity domain manager 144, the memory manager 140, the one or more processors 190, the device 102, the system 100 of FIG. 1, the processor 2706, the one or more processors 2710, the device 2700, one or more other circuits or components configured to assign distinct domain identifiers to each of multiple software threads, or any combination thereof.

In some implementations, a non-transitory computer-readable medium (e.g., a computer-readable storage device, such as the memory 2786) includes instructions (e.g., the instructions 2756) that, when executed by one or more processors (e.g., the one or more processors 2710 or the processor 2706), cause the one or more processors to assign distinct domain identifiers (e.g., the consistency domain identifiers 156, the capacity domain identifiers 158, or both) to each of multiple software threads. The instructions, when executed by the one or more processors, also cause the one or more processors to control operation of one or more components (e.g., the one or more components 170) of the processor based on a number of memory transactions associated with a domain identifier (e.g., the consistency domain number of transactions data 162, the capacity domain number of transactions data 164, or both).

Particular aspects of the disclosure are described below in sets of interrelated clauses:

According to Clause 1, a device includes: a memory; and a processor coupled to the memory and configured to: assign distinct domain identifiers to each of multiple software threads; and control operation of one or more components of the processor based on a number of memory transactions associated with a domain identifier.

Clause 2 includes the device of Clause 1, further including a cache control register associated with a first software thread, and wherein assigning a first domain identifier to the first software thread includes updating the cache control register to indicate the first domain identifier.

Clause 3 includes the device of Clause 1 or Clause 2, wherein the processor is configured to receive a synchronization instruction of a first software thread, the first software thread assigned a first consistency domain identifier, and wherein controlling the operation includes, in response to receiving the synchronization instruction, completing any pending store operations associated with the first consistency domain identifier prior to performing any subsequent data access instruction associated with the first consistency domain identifier.

Clause 4 includes the device of Clause 3, wherein the processor is configured to, in response to receiving a synchronization instruction associated with a second consistency domain identifier that matches the first consistency domain identifier, complete any pending store operations associated with the first consistency domain identifier prior to performing any subsequent data access instruction associated with the second consistency domain identifier.

Clause 5 includes the device of Clause 4, wherein the second consistency domain identifier indicates a sub-domain of a consistency domain that is indicated by the first consistency domain identifier.

Clause 6 includes the device of Clause 4, wherein the first consistency domain identifier is the same as the second consistency domain identifier.

Clause 7 includes the device of any of Clause 3 to Clause 6, wherein the synchronization instruction includes a barrier instruction or a store-release load-acquire instruction.

Clause 8 includes the device of any of Clause 1 to Clause 7, further including: a cache configured to store data of the memory; and a transaction tracking scoreboard configured to track one or more pending stores associated with one or more consistency domain identifiers, wherein the processor is configured to, in response to receiving a write instruction of a first software thread indicating a first memory location and determining that data associated with the first memory location is not available in the cache: load first data from the first memory location to a first portion of the cache; and update the first data in the cache.

Clause 9 includes the device of Clause 8, wherein the processor is configured to, in response to a store associated with the first software thread being committed, update an entry of the transaction tracking scoreboard to indicate a pending store operation of the updated first data to the first memory location, the entry updated to indicate the first memory location and a first consistency domain identifier of the first software thread.

Clause 10 includes the device of Clause 9, wherein the processor is further configured to: receive an acknowledgement indicating that storage of the updated first data to the first memory location is complete; and in response to receiving the acknowledgement, update the transaction tracking scoreboard to indicate that the entry of the transaction tracking scoreboard is invalid.

Clause 11 includes the device of any of Clause 8 to Clause 10, wherein the processor is configured to, in response to receiving a memory access instruction of a second software thread indicating a second memory location when data corresponding to the second memory location is not available in the cache and the cache is full: initiate an eviction of the updated first data from the cache; and load second data from the second memory location to the first portion of the cache.

Clause 12 includes the device of Clause 11, wherein initiating the eviction of the updated first data includes updating an entry of the transaction tracking scoreboard to indicate a pending eviction of the updated first data corresponding to the first memory location.

Clause 13 includes the device of Clause 12, wherein the processor is further configured to: receive an acknowledgement indicating that storage of the updated first data to the first memory location is complete; and in response to receiving the acknowledgement, update the transaction tracking scoreboard to indicate that the entry of the transaction tracking scoreboard is invalid.

Clause 14 includes the device of any of Clause 8 to Clause 13, wherein the processor is configured to, in response to determining that a cache operation having a second consistency domain identifier is associated with the first memory location corresponding to the updated first data stored in the first portion of the cache: initiate an eviction of the updated first data from the cache; and update the cache to indicate that the first portion of the cache is available.

Clause 15 includes the device of Clause 14, wherein initiating the eviction of the updated first data includes updating an entry of the transaction tracking scoreboard to indicate a pending eviction of the updated first data and to indicate a pending store operation associated with the second consistency domain identifier.

Clause 16 includes the device of Clause 15, wherein the processor is further configured to: receive an acknowledgement indicating that storage of the updated first data to the first memory location is complete; and in response to receiving the acknowledgement, update the transaction tracking scoreboard to indicate that the entry of the transaction tracking scoreboard is invalid.

Clause 17 includes the device of any of Clause 1 to Clause 16, further including a cache configured to store data of the memory, wherein the processor is configured to, in response to determining that a cache operation is associated with a second memory location and that no valid data associated with the second memory location is stored in the cache, assign a second consistency domain identifier of the cache operation to any pending evictions associated with the second memory location.

Clause 18 includes the device of any of Clause 1 to Clause 17, further including: a cache configured to store data of the memory; and a transaction tracking scoreboard, wherein the processor is configured to, in response to determining that a cache operation is associated with a second memory location, that no valid data associated with the second memory location is stored in the cache, and that an entry of the transaction tracking scoreboard corresponds to a pending eviction associated with the second memory location, update the entry of the transaction tracking scoreboard to indicate a second consistency domain identifier of the cache operation.

Clause 19 includes the device of Clause 18, wherein the processor is further configured to: receive an acknowledgement indicating that a store associated with the entry of the transaction tracking scoreboard is complete; and in response to receiving the acknowledgement, update the transaction tracking scoreboard to indicate that the entry of the transaction tracking scoreboard is invalid.

Clause 20 includes the device of any of Clause 1 to Clause 19, wherein the processor is configured to receive a memory access instruction from a first software thread, the first software thread assigned a first capacity domain identifier, and wherein controlling the operation includes selectively enabling the memory access instruction based on a count of pending memory access instructions associated with the first capacity domain identifier.

Clause 21 includes the device of Clause 20, wherein the processor is configured to, based on determining that the count of pending memory access instructions is less than a threshold count corresponding to the first capacity domain identifier: initiate a memory access associated with the memory access instruction; and increment the count of pending memory access instructions associated with the first capacity domain identifier.

Clause 22 includes the device of Clause 21, wherein the processor is configured to: receive an acknowledgement indicating that the memory access is complete; and in response to receiving the acknowledgement, decrement the count of pending memory access instructions associated with the first capacity domain identifier.

Clause 23 includes the device of any of Clause 1 to Clause 22, wherein a first domain identifier is assigned to the first software thread based at least in part on a communication type associated with the first software thread, and wherein the communication type includes cellular modem traffic or wireless local-area network (WLAN) traffic.

According to Clause 24, a computer-implemented method includes: assigning, at a device, distinct domain identifiers to each of multiple software threads; and controlling, at the device, operation of one or more components of a processor based on a number of memory transactions associated with a domain identifier.

Clause 25 includes the computer-implemented method of Clause 24, wherein a cache control register is associated with a first software thread, and wherein assigning a first domain identifier to the first software thread includes updating the cache control register to indicate the first domain identifier.

Clause 26 includes the computer-implemented method of Clause 24 or Clause 25, further including receiving a synchronization instruction of a first software thread, the first software thread assigned a first consistency domain identifier, wherein controlling the operation includes, in response to receiving the synchronization instruction, completing any pending store operations associated with the first consistency domain identifier prior to performing any subsequent data access instruction associated with the first consistency domain identifier.

Clause 27 includes the computer-implemented method of Clause 26, further including, in response to receiving a synchronization instruction associated with a second consistency domain identifier that matches the first consistency domain identifier, completing any pending store operations associated with the first consistency domain identifier prior to performing any subsequent data access instruction associated with the second consistency domain identifier.

Clause 28 includes the computer-implemented method of Clause 27, wherein the second consistency domain identifier indicates a sub-domain of a consistency domain that is indicated by the first consistency domain identifier.

Clause 29 includes the computer-implemented method of Clause 27, wherein the first consistency domain identifier is the same as the second consistency domain identifier.

Clause 30 includes the computer-implemented method of any of Clause 26 to Clause 29, wherein the synchronization instruction includes a barrier instruction or a store-release load-acquire instruction.

Clause 31 includes the computer-implemented method of Clause 24 to Clause 30, further including, in response to receiving a write instruction of a first software thread indicating a first memory location and determining that data associated with the first memory location is not available in a cache: loading first data from the first memory location to a first portion of the cache; and updating the first data in the cache.

Clause 32 includes the computer-implemented method of Clause 31, further including, in response to a store associated with the first software thread being committed, updating an entry of a transaction tracking scoreboard to indicate a pending store operation of the updated first data to the first memory location, the entry updated to indicate the first memory location and a first consistency domain identifier of the first software thread.

Clause 33 includes the computer-implemented method of Clause 32, further including: receiving an acknowledgement indicating that storage of the updated first data to the first memory location is complete; and in response to receiving the acknowledgement, updating the transaction tracking scoreboard to indicate that the entry of the transaction tracking scoreboard is invalid.

Clause 34 includes the computer-implemented method of any of Clause 31 to Clause 33, further including, in response to receiving a memory access instruction of a second software thread indicating a second memory location when data corresponding to the second memory location is not available in the cache and the cache is full: initiating an eviction of the updated first data from the cache; and loading second data from the second memory location to the first portion of the cache.

Clause 35 includes the computer-implemented method of Clause 34, wherein initiating the eviction of the updated first data includes updating an entry of the transaction tracking scoreboard to indicate a pending eviction of the updated first data corresponding to the first memory location.

Clause 36 includes the computer-implemented method of Clause 35, further including: receiving an acknowledgement indicating that storage of the updated first data to the first memory location is complete; and in response to receiving the acknowledgement, updating the transaction tracking scoreboard to indicate that the entry of the transaction tracking scoreboard is invalid.

Clause 37 includes the computer-implemented method of any of Clause 31 to Clause 36, wherein the processor is configured to, in response to determining that a cache operation having a second consistency domain identifier is associated with the first memory location corresponding to the updated first data stored in the first portion of the cache: initiating an eviction of the updated first data from the cache; and updating the cache to indicate that the first portion of the cache is available.

Clause 38 includes the computer-implemented method of Clause 37, wherein initiating the eviction of the updated first data includes updating an entry of the transaction tracking scoreboard to indicate a pending eviction of the updated first data and to indicate a pending store operation associated with the second consistency domain identifier.

Clause 39 includes the computer-implemented method of Clause 38, further including: receiving an acknowledgement indicating that storage of the updated first data to the first memory location is complete; and in response to receiving the acknowledgement, updating the transaction tracking scoreboard to indicate that the entry of the transaction tracking scoreboard is invalid.

Clause 40 includes the computer-implemented method of any of Clause 24 to Clause 39, further including, in response to determining that a cache operation is associated with a second memory location and that no valid data associated with the second memory location is stored in a cache, assign a second consistency domain identifier of the cache operation to any pending evictions associated with the second memory location.

Clause 41 includes the computer-implemented method of any of Clause 24 to Clause 40, further including, in response to determining that a cache operation is associated with a second memory location, that no valid data associated with the second memory location is stored in a cache, and that an entry of a transaction tracking scoreboard corresponds to a pending eviction associated with the second memory location, updating the entry of the transaction tracking scoreboard to indicate a second consistency domain identifier of the cache operation.

Clause 42 includes the computer-implemented method of Clause 41, further including: receiving an acknowledgement indicating that a store associated with the entry of the transaction tracking scoreboard is complete; and in response to receiving the acknowledgement, updating the transaction tracking scoreboard to indicate that the entry of the transaction tracking scoreboard is invalid.

Clause 43 includes the computer-implemented method of any of Clause 24 to Clause 42, further including receiving a memory access instruction from a first software thread, the first software thread assigned a first capacity domain identifier, wherein controlling the operation includes selectively enabling the memory access instruction based on a count of pending memory access instructions associated with the first capacity domain identifier.

Clause 44 includes the computer-implemented method of Clause 43, further including, based on determining that the count of pending memory access instructions is less than a threshold count corresponding to the first capacity domain identifier: initiating a memory access associated with the memory access instruction; and incrementing the count of pending memory access instructions associated with the first capacity domain identifier.

Clause 45 includes the computer-implemented method of Clause 44, further including: receiving an acknowledgement indicating that the memory access is complete; and in response to receiving the acknowledgement, decrementing the count of pending memory access instructions associated with the first capacity domain identifier.

Clause 46 includes the computer-implemented method of any of Clause 24 to Clause 45, wherein a first domain identifier is assigned to the first software thread based at least in part on a communication type associated with the first software thread, and wherein the communication type includes cellular modem traffic or wireless local-area network (WLAN) traffic.

According to Clause 47, a device includes: a memory configured to store instructions; and a processor configured to execute the instructions to perform the method of any of Clause 24 to Clause 46.

According to Clause 48, a non-transitory computer-readable medium stores instructions that, when executed by a processor, cause the processor to perform the method of any of Clause 24 to Clause 46.

According to Clause 49, an apparatus includes means for carrying out the method of any of Clause 24 to Clause 46.

According to Clause 50, a non-transitory computer-readable medium stores instructions that, when executed by a processor, cause the processor to: assign distinct domain identifiers to each of multiple software threads; and control operation of one or more components of the processor based on a number of memory transactions associated with a domain identifier.

Clause 51 includes the non-transitory computer-readable medium of Clause 50, wherein the instructions, when executed by the processor, cause the processor to receive a synchronization instruction of a first software thread, the first software thread assigned a first consistency domain identifier, wherein controlling the operation includes, in response to receiving the synchronization instruction, completing any pending store operations associated with the first consistency domain identifier prior to performing any subsequent data access instruction associated with the first consistency domain identifier.

According to Clause 52, an apparatus includes: means for assigning distinct domain identifiers to each of multiple software threads; and means for controlling operation of one or more components of a processor based on a number of memory transactions associated with a domain identifier.

Clause 53 includes the apparatus of Clause 52, wherein the means for assigning and the means for controlling are integrated into at least one of a smart speaker, a speaker bar, a display device, a television, a gaming console, a music player, a camera, a navigation device, a vehicle, a headset, an augmented reality headset, a mixed reality headset, a virtual reality headset, an aerial vehicle, a home automation system, a voice-activated device, a wireless speaker and voice activated device, a computing device, a communication device, an internet-of-things (IoT) device, a virtual reality (VR) device, a base station, or a mobile device.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
  a memory; and
  a processor coupled to the memory and configured to:
    assign distinct domain identifiers to each of multiple software threads, wherein a first consistency domain identifier is assigned to a first software thread based at least in part on a communication type associated with the first software thread, and wherein the communication type is one of cellular modem traffic or wireless local-area network (WLAN) traffic;
    receive a synchronization instruction associated with a second consistency domain identifier that matches the first consistency domain identifier; and
    in response to receiving the synchronization instruction, complete any pending store operations associated with the first consistency domain identifier prior to performing any subsequent data access instruction associated with the second consistency domain identifier.

2. The device of claim 1, further comprising a cache control register associated with the first software thread, and wherein assigning the first consistency domain identifier to the first software thread includes updating the cache control register to indicate the first consistency domain identifier.

3. The device of claim 1, wherein the processor is configured to:
  receive a second synchronization instruction of the first software thread; and
  in response to receiving the second synchronization instruction, complete any pending store operations associated with the first consistency domain identifier prior to performing any subsequent data access instruction associated with the first consistency domain identifier.

4. The device of claim 1, wherein the second consistency domain identifier indicates a sub-domain of a consistency domain that is indicated by the first consistency domain identifier.

5. The device of claim 1, wherein the first consistency domain identifier is the same as the second consistency domain identifier.

6. The device of claim 3, wherein the second synchronization instruction includes a barrier instruction or a store-release load-acquire instruction.

7. The device of claim 1, further comprising:
  a cache configured to store data of the memory; and
  a transaction tracking scoreboard configured to track one or more pending stores associated with one or more consistency domain identifiers,
  wherein the processor is configured to, in response to receiving a write instruction of a third software thread indicating a first memory location and determining that data associated with the first memory location is not available in the cache:
    load first data from the first memory location to a first portion of the cache; and update the first data in the cache.

8. The device of claim 7, wherein the processor is configured to, in response to a store associated with the third software thread being committed, update an entry of the transaction tracking scoreboard to indicate a pending store operation of the updated first data to the first memory location, the entry updated to indicate the first memory location and a third consistency domain identifier of the third software thread.

9. The device of claim 8, wherein the processor is further configured to:
  receive an acknowledgement indicating that storage of the updated first data to the first memory location is complete; and
  in response to receiving the acknowledgement, update the transaction tracking scoreboard to indicate that the entry of the transaction tracking scoreboard is invalid.

10. The device of claim 7, wherein the processor is configured to, in response to receiving a memory access instruction of a fourth software thread indicating a second memory location when data corresponding to the second memory location is not available in the cache and the cache is full:
  initiate an eviction of the updated first data from the cache; and
  load second data from the second memory location to the first portion of the cache.

11. The device of claim 10, wherein initiating the eviction of the updated first data includes updating an entry of the transaction tracking scoreboard to indicate a pending eviction of the updated first data corresponding to the first memory location.

12. The device of claim 11, wherein the processor is further configured to:
  receive an acknowledgement indicating that storage of the updated first data to the first memory location is complete; and
  in response to receiving the acknowledgement, update the transaction tracking scoreboard to indicate that the entry of the transaction tracking scoreboard is invalid.

13. The device of claim 7, wherein the processor is configured to, in response to determining that a cache operation having a fourth consistency domain identifier is associated with the first memory location corresponding to the updated first data stored in the first portion of the cache:
  initiate an eviction of the updated first data from the cache; and
  update the cache to indicate that the first portion of the cache is available.

14. The device of claim 13, wherein initiating the eviction of the updated first data includes updating an entry of the transaction tracking scoreboard to indicate a pending eviction of the updated first data and to indicate a pending store operation associated with the fourth consistency domain identifier.

15. The device of claim 14, wherein the processor is further configured to:
  receive an acknowledgement indicating that storage of the updated first data to the first memory location is complete; and
  in response to receiving the acknowledgement, update the transaction tracking scoreboard to indicate that the entry of the transaction tracking scoreboard is invalid.

16. The device of claim 1, further comprising a cache configured to store data of the memory, wherein the processor is configured to, in response to determining that a cache operation is associated with a second memory location and that no valid data associated with the second memory location is stored in the cache, assign a fourth consistency domain identifier of the cache operation to any pending evictions associated with the second memory location.

17. The device of claim 1, further comprising:
  a cache configured to store data of the memory; and a transaction tracking scoreboard,
wherein the processor is configured to, in response to determining that a cache operation is associated with a second memory location, that no valid data associated with the second memory location is stored in the cache, and that an entry of the transaction tracking scoreboard corresponds to a pending eviction associated with the second memory location, update the entry of the transaction tracking scoreboard to indicate a fourth consistency domain identifier of the cache operation.

18. The device of claim 17, wherein the processor is further configured to:
receive an acknowledgement indicating that a store associated with the entry of the transaction tracking scoreboard is complete; and
in response to receiving the acknowledgement, update the transaction tracking scoreboard to indicate that the entry of the transaction tracking scoreboard is invalid.

19. The device of claim 1, wherein the processor is configured to:
receive a memory access instruction from a third software thread, the third software thread assigned a third capacity domain identifier; and
selectively enable the memory access instruction based on a count of pending memory access instructions associated with the third capacity domain identifier.

20. The device of claim 19, wherein the processor is configured to, based on determining that the count of pending memory access instructions is less than a threshold count corresponding to the third capacity domain identifier:
initiate a memory access associated with the memory access instruction; and
increment the count of pending memory access instructions associated with the third capacity domain identifier.

21. The device of claim 20, wherein the processor is configured to:
receive an acknowledgement indicating that the memory access is complete; and
in response to receiving the acknowledgement, decrement the count of pending memory access instructions associated with the third capacity domain identifier.

22. A computer-implemented method comprising:
assigning, at a device, distinct domain identifiers to each of multiple software threads, wherein a first consistency domain identifier is assigned to a first software thread based at least in part on a communication type associated with the first software thread, and wherein the communication type is one of cellular modem traffic or wireless local-area network (WLAN) traffic;
receiving, at the device, a synchronization instruction associated with a second consistency domain identifier that matches the first consistency domain identifier; and
in response to receiving the synchronization instruction, completing any pending store operations associated with the first consistency domain identifier prior to performing any subsequent data access instruction associated with the second consistency domain identifier.

23. The computer-implemented method of claim 22, wherein a cache control register is associated with the first software thread, and wherein assigning the first consistency domain identifier to the first software thread includes updating the cache control register to indicate the first consistency domain identifier.

24. The computer-implemented method of claim 22, further comprising:
receiving a second synchronization instruction of the first software thread; and
in response to receiving the second synchronization instruction, completing any pending store operations associated with the first consistency domain identifier prior to performing any subsequent data access instruction associated with the first consistency domain identifier.

25. A non-transitory computer-readable medium storing instructions that, when executed by a processor, cause the processor to:
assign distinct domain identifiers to each of multiple software threads, wherein a first consistency domain identifier is assigned to a first software thread based at least in part on a communication type associated with the first software thread, and wherein the communication type is one of cellular modem traffic or wireless local-area network (WLAN) traffic;
receive a synchronization instruction associated with a second consistency domain identifier that matches the first consistency domain identifier; and
in response to receiving the synchronization instruction, complete any pending store operations associated with the first consistency domain identifier prior to performing any subsequent data access instruction associated with the second consistency domain identifier.

26. The non-transitory computer-readable medium of claim 25, wherein the instructions, when executed by the processor, cause the processor to:
receive a second synchronization instruction of the first software thread; and
in response to receiving the second synchronization instruction, complete any pending store operations associated with the first consistency domain identifier prior to performing any subsequent data access instruction associated with the first consistency domain identifier.

27. An apparatus comprising:
means for assigning distinct domain identifiers to each of multiple software threads, wherein a first consistency domain identifier is assigned to a first software thread based at least in part on a communication type associated with the first software thread, and wherein the communication type is one of cellular modem traffic or wireless local-area network (WLAN) traffic;
means for receiving a synchronization instruction associated with a second consistency domain identifier that matches the first consistency domain identifier; and
means for completing, in response to receiving the synchronization instruction, any pending store operations associated with the first consistency domain identifier prior to performing any subsequent data access instruction associated with the second consistency domain identifier.

28. The apparatus of claim 27, wherein the means for assigning, the means for receiving, and the means for completing are integrated into at least one of a smart speaker, a speaker bar, a display device, a television, a gaming console, a music player, a camera, a navigation device, a vehicle, a headset, an augmented reality headset, a mixed reality headset, a virtual reality headset, an aerial vehicle, a home automation system, a voice-activated device, a wireless speaker and voice activated device, a computing device, a communication device, an internet-of-things (IoT) device, a virtual reality (VR) device, a base station, or a mobile device.

* * * * *